US011493391B2

(12) United States Patent
Sanger et al.

(10) Patent No.: US 11,493,391 B2
(45) Date of Patent: Nov. 8, 2022

(54) GRADIENT SENSOR

(71) Applicant: Woods Hole Oceanographic Institution, Woods Hole, MA (US)

(72) Inventors: Richard Sanger, Woods Hole, MA (US); Paul D. Fucile, Waquoit, MA (US); Maurice Tivey, N. Falmouth, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 156 days.

(21) Appl. No.: 16/346,790

(22) PCT Filed: Jul. 26, 2018

(86) PCT No.: PCT/US2018/043971
§ 371 (c)(1),
(2) Date: May 1, 2019

(87) PCT Pub. No.: WO2019/023506
PCT Pub. Date: Jan. 31, 2019

(65) Prior Publication Data
US 2020/0141816 A1 May 7, 2020

Related U.S. Application Data

(60) Provisional application No. 62/537,113, filed on Jul. 26, 2017.

(51) Int. Cl.
*G01K 17/08* (2006.01)
*G01C 9/02* (2006.01)
(Continued)

(52) U.S. Cl.
CPC ............... *G01K 17/08* (2013.01); *G01C 9/02* (2013.01); *G01C 13/00* (2013.01); *G01K 1/026* (2013.01); *G01K 13/00* (2013.01); *G01K 2215/00* (2013.01)

(58) Field of Classification Search
CPC .. G01K 17/08–20; G01K 13/02; G01K 1/026; G01K 2215/00; G01N 33/1886; G01C 9/02–08
See application file for complete search history.

(56) References Cited

U.S. PATENT DOCUMENTS 4,676,664 A 6/1987 Anderson et al.
5,272,476 A * 12/1993 McArthur ................ H04Q 9/16
340/10.2
(Continued)

OTHER PUBLICATIONS

Nagihara, S., et al. "Multi-outrigger-bow marine heat flow instrumentation." EOS Trans. Am. geophys. Un. 70 (1989): 1305. (Year: 1989).*
(Continued)

*Primary Examiner* — Liang Y Li
(74) *Attorney, Agent, or Firm* — Douglas Denninger

(57) ABSTRACT

A gradient sensing probe system, and method of using same, including a sensing segment which includes a plurality of sensors, a support structure, and an electrical interface having first and second faces. The system further includes a housing, a power source, and an electronics package including a controller and disposed within the housing. The sensing segment is configured to measure external gradients and to exchange data with the controller. The power source is connected energetically to provide power to the sensing segment and the electronics package, and is controlled by the controller.

20 Claims, 9 Drawing Sheets

(51) Int. Cl.
*G01K 1/02* (2021.01)
*G01K 13/00* (2021.01)
*G01C 13/00* (2006.01)

(56) References Cited

U.S. PATENT DOCUMENTS

| | | | | |
|---|---|---|---|---|
| 5,663,927 | A | * | 9/1997 | Olson ............... G01V 1/38 367/4 |
| 8,773,947 | B2 | * | 7/2014 | Payor ............... G01V 1/38 367/15 |
| 9,463,849 | B2 | | 10/2016 | McCabe et al. |
| 10,180,360 | B1 | * | 1/2019 | Naranjo ............ G01K 1/026 |
| 10,405,069 | B2 | * | 9/2019 | Basheer ........... G06F 13/4086 |
| 2003/0145646 | A1 | * | 8/2003 | Henry ............... G01N 33/1886 73/19.1 |
| 2005/0098377 | A1 | | 5/2005 | Bary et al. |
| 2011/0229141 | A1 | | 9/2011 | Chave et al. |
| 2015/0003194 | A1 | | 1/2015 | Brizard |
| 2016/0369919 | A1 | | 12/2016 | Peters |
| 2017/0131432 | A1 | * | 5/2017 | Yang ................. G01V 9/005 |
| 2017/0368655 | A1 | * | 12/2017 | Bergman ......... B23Q 11/0071 |
| 2018/0348078 | A1 | | 12/2018 | Parsons |

OTHER PUBLICATIONS

Vezzini, Andrea. "Lithium-ion battery management." Lithium-Ion Batteries. Elsevier, 2014. 345-360. (Year: 2014).*

Hyndman, R. D., E. E. Davis, and J. A. Wright. "The measurement of marine geothermal heat flow by a multipenetration probe with digital acoustic telemetry and insitu thermal conductivity." Marine Geophysical Researches 4.2 (1979): 181-205. (Year: 1979).*

Hudson, R. D., et al. "A High Resolution Geothermal Heat Probe." Proceedings Oceans. vol. 5. IEEE, 1989. (Year: 1989).*

OceanTILT Underwater Dual Axis Inclinometer. OceanTools. Retreived Jan. 31, 2017. <https://web.archive.org/web/20170103143349/http://www.oceantools.co.uk/survey/oceantilt-underwater-inclinometer> (Year: 2017).*

Earl E. Davis et al., "Seafloor Heat Flow: Methods and Observations", Encycl. of Solid Earth Geophysics, 2011, pp. 1-12, Ch. 65, Springer Science+Bus. Media B.V., Netherlands.

John G. Sclater "Marine Heat Flow", Chapter in Encycl. of Marine Geosciences, Jan. 2014, pp. 1-16, Springer Science+Bus. Media Dordrecht, Netherlands.

Keith E. Louden et al., "Marine Heat Flow Observations on the Canadian Arctic Continental Shelf and Slope", Marine Geology, 1990, pp. 267-288, vol. 93, Elsevier Sci. Publ. B.V., Netherlands.

Unknown, "Geothermal Heat Probe Manual", Apr. 8, 2003, pp. 1-2, 7-12, 51, 114-124 and 148-151, Pac. Geosci. Centre, Geol. Survey, Canada.

R. D. Hyndman et al., "The Measurement of Marine Geothermal Heat Flow by a Multipenetration Probe With Digital Acoustic Telemetry and Insitu Thermal Conductivity", Marine Geophysical Researches 4, 1979, pp. 181-205, D. Reidel Publ. Co.

C R B Lister "The pulse-probe method of conductivity measurement", Geophys. J. R. astr. Soc., 1979, pp. 451-461, vol. 57.

Seiichi Nagihara and Clive R. B. Lister, "Accuracy of marine heat-flow instrumentation: numerical studies on the effects of probe construction and the data reduction scheme", Geophys. J. Int., 1993, pp. 161-177, vol. 112.

Louis Geli et al "Deep-penetration heat flow probes raise questions about interpretations from shorter probes" Eos, Transactions, American Geophysical Union, 2001, pp. 317-320, vol. 82, No. 29.

A. T. Fisher, "Comment", Eos, 2002, pp. 196-197, vol. 83, No. 18.

Earl E. Davis et al., "Comment", Eos, 2002, pp. 197-198, vol. 83, No. 18.

A. Hartmann and H. Villinger, "Inversion of marine heat flow measurements by expansion of the temperature decay function", Geophys. J. Int., 2002, pp. 628-636, Vo. 148.

* cited by examiner

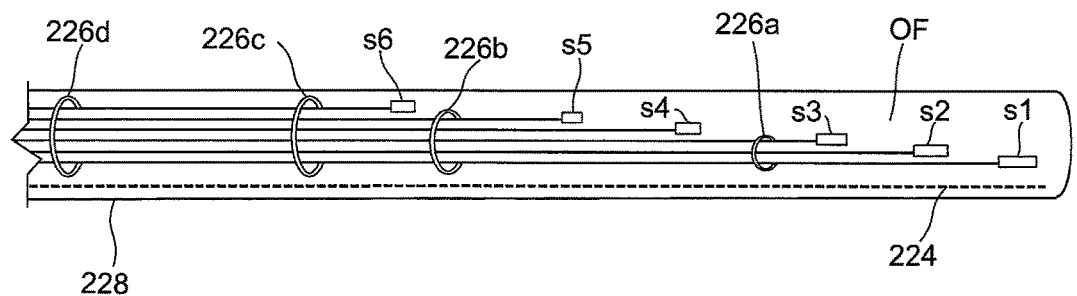
FIG. 2C
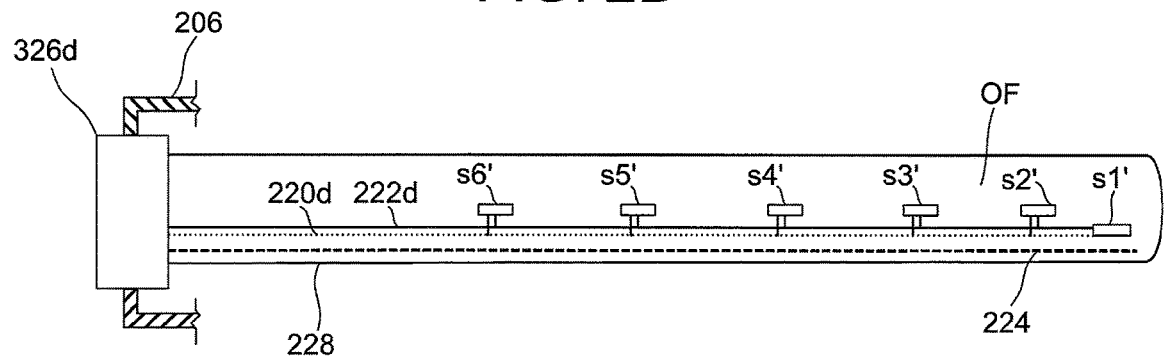
FIG. 2D
FIG. 3
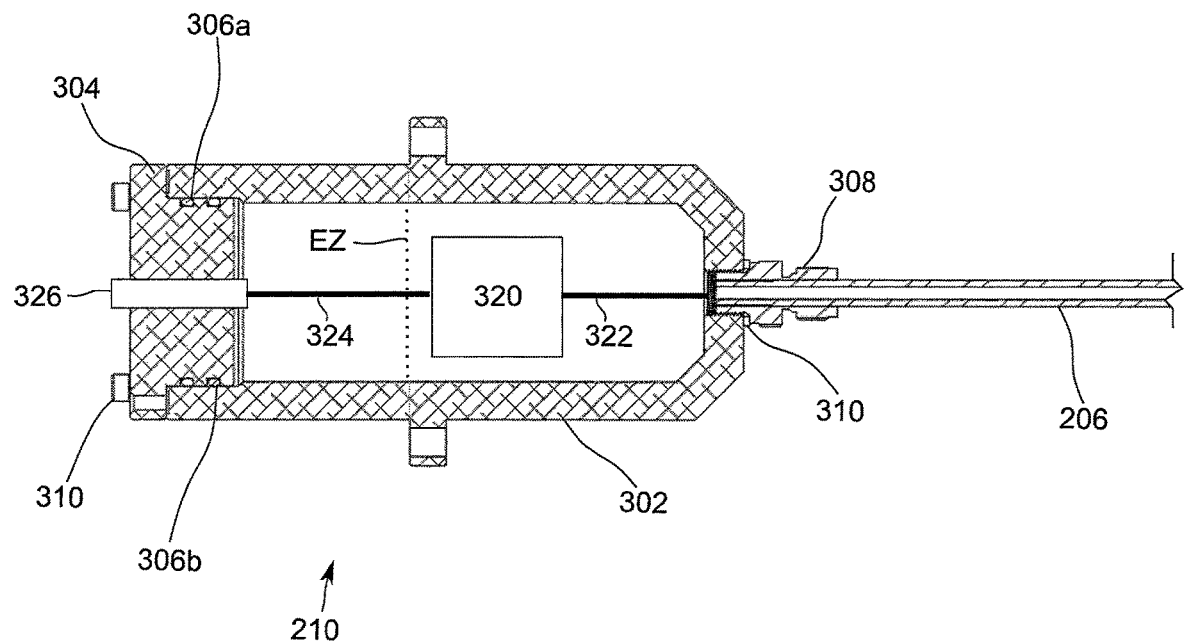

FIG. 6A
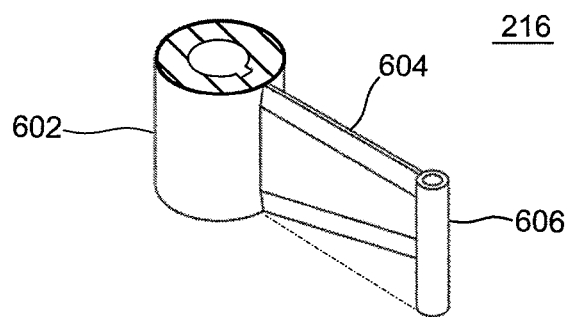
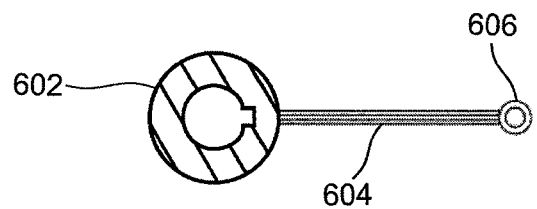
FIG. 6B
FIG. 6C    FIG. 6D
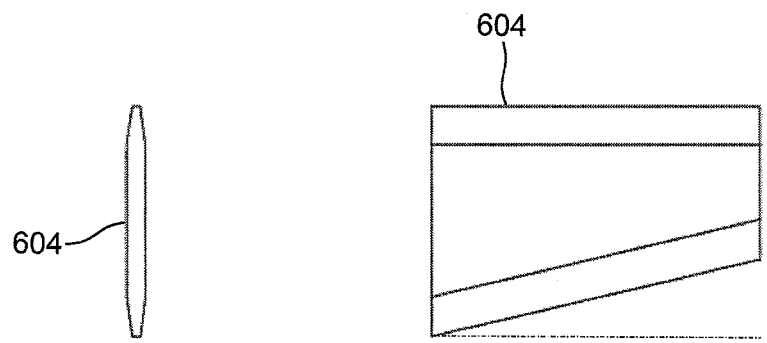

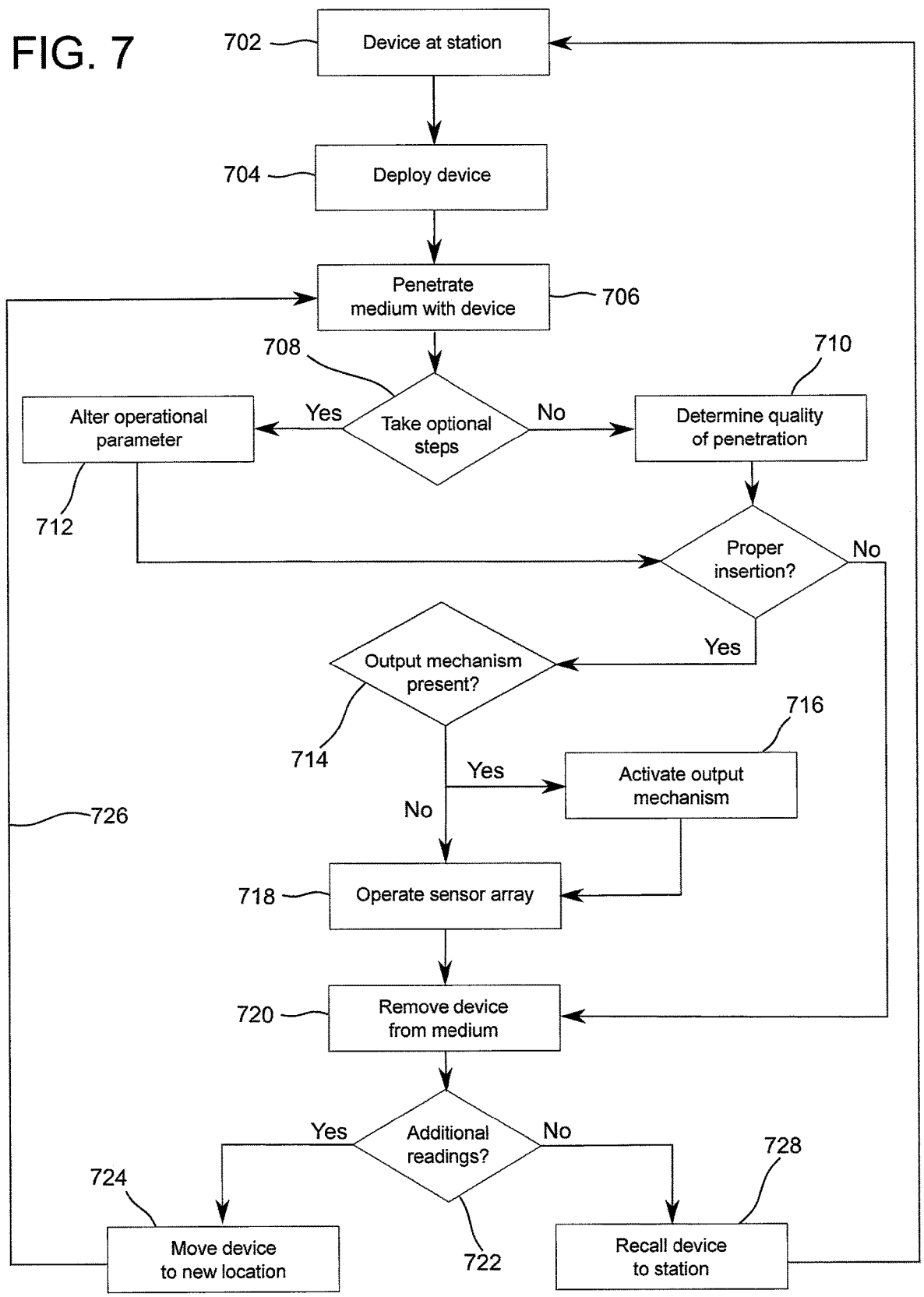

GRADIENT SENSOR

CROSS REFERENCE TO RELATED APPLICATIONS

This application claims priority to U.S. Provisional Application No. 62/537,113 filed on Jul. 26, 2017, the contents of which are hereby incorporated as if set forth herein in its entirety.

FIELD OF THE INVENTION

This invention relates to systems and methods for measuring differential gradients in target media, and more particularly to a probe system for measuring gradients (e.g. thermal) or other physical properties of marine sediments.

BACKGROUND

The precise measurement of physical and chemical gradients in fluid and marine environments is a requirement for many oceanographic pursuits. Understanding magnetic, thermal, acid, and vibrational gradients in underwater environments has importance in both basic research and in applied areas such as oil, gas and ore exploration and development. Gradient measurements contribute to our knowledge of the composition of sea floor sediments, subduction zones, marine sea mounts and ridges.

Existing underwater gradient measurement systems are capable of collecting and recording marine physical gradients, however most designs have not changed in many years and these systems are imprecise, difficult to build devices with low resolution of gradient sensing. One example is temperature or thermal gradient probes, often called heat flow probes (HFP), that follow a 'bow string' design such as described by C.R.B. Lister in "The pulse-probe method of conductivity measurement", Geophysical Journal International, vol 57, pages 451-461 (1979) and by Hyndman et al., Marine Geophysical Researches vol 4, pages 181-205 (1979). These instruments are designed to be dropped from oceangoing vessels to penetrate seafloor sediments. Once in position the instruments inject heat along a linear axis and measure the dissipation of that heat over time. Sensor data is then stored onboard the device, with limited data relay capabilities and no real-time, operational control of the deployed device. Certain refinements are described by Louden et al., Marine Geology, vol 93 pages 267-288 (1990); Nagihara and Lister, Geophysical Journal International, vol 112, pages 161-177 (1993); Fisher et al, Eos, Transactions American Geophysical Union, vol 83, page 196 (2002); and Hartmann et al., Geophysical Journal International, vol 148 (3) pages 628-636 (2002). More modern heat flow probes are robust enough to be dropped into their target medium multiple times each deployment, typically performing a measurement every tens of meters or 100s of meters, penetrating 3 to 5 meters, and measuring heat flow at intervals of tens of centimeters along the length of the probe.

However, existing heat flow probe technology suffers from 1) inadequate gradient sensing resolution, 2) handling and transport difficulties due to size and weight, 3) insufficient real-time data communication transfer capabilities, 4) imprecise position and orientation sensing, and 5) inappropriate probe design (e.g. length) for changing target mediums in an area of interest. HFPs of the art are limited by the number of sensors they can incorporate into their design. They have relied on running analog sensor output wires from the sensing bow string to the probe's housing, requiring a complex electrical bulkhead between the housing and the bow string sensor segment. This drawback physically limits the resolution and data accuracy by limiting the number of sensors, typically to less than about 10 sensors, and introduces significant thermal mass issues which may alter readings. Running analog sensor output wires from the bow string sensor to the housing also increases the complexity of the connections between these components. Complex electrical connections introduce signal noise between the sensors, reducing the data limits of detection, resolution and accuracy. Complex connections also prevent the probes from being modular; in other words, users cannot easily swap different probe components during an exploratory cruise. The ocean bottom can change drastically in a short span of distance, and during a single cruise, an area of interest may have sediments where an ideal penetration depth may vary from 3 meters to 10 meters, or more. Currently, multiple probes are required to test a single area, but a modular probe would allow for on-deck changes to probes of different lengths. Shallow water areas especially need probes of different lengths.

Another limitation of HFPs is that they generally contain only crude acoustic output capability via simple a pingers. Pingers are underwater acoustic devices that emit a standard acoustic frequency pulse. Pingers can be used to locate an underwater structure, object or surface (e.g. the seafloor). Pingers can also be instructed by a controller to change the pulse frequency to relay limited amounts of information. Current HFPs have often contain modified bottom-finder pingers, such as the Datasonics Model BFP-312 manufactured by Benthos, Inc. These devices have bandwidth to relay data from a subset of the temperature sensors and relay temperatures back as fractions of a second delay per degree, for example, $1/10^{th}$ a second delay per 1° C. registered from a sensor. Crude tilt information is also relayed by delayed ping. A probe equipped with a pinger is greatly restricted in the amount of data it can transfer per second, as measured by bytes per second (bps). For example, PGC Manual 2003 describes a five second protocol to transmit data from 5 channels (exterior temperature, crude tilt and three thermistors). Each signal is encoded in 8 bit, translating to 1 byte, and each signal is given an entire second. Therefor pinger equipped HFPs are not known to transmit information over 1 bps.

As built, current HFPs employing pingers as communications system can transmit information one direction (from HFP to the surface) and cannot receive information or commands from the user (at the surface) for the probe's controller. Therefore, current HFPs are generally limited to pre-programmed operational parameters, including heat pulse duration, delay and intensity that cannot be adjusted in real time during probe operation. For example, the time between penetration and the first heat pulse is pre-programmed and conventional systems limit any changes to heating timing to one minute intervals, and are only capable of being adjusted within only 5 to 15 minutes after insertion. Changes to these parameters must be done by a physical connection. The HFP must be on deck, out of the water and the pressure housing opened, in order to access a serial port to connect to a user's computer. Therefore, there is a need for a Gradient Sensing Device that has real-time connectivity and on-the-fly programmability, based on real-time sensor results.

Existing gradient sensing systems are also limited in other parameters they can measure and the amount of associated information that can be sent back to the user in real time.

One conventional system measures tilt angle with a non-linear, dual-axis electrolytic tilt sensor, is only sensitive to tilt ranging from 0 to 40 degrees away from vertical, and with only a half a degree resolution. Precise knowledge of the tilt of a penetrated probe is critical, because the sensors will not be exactly 90 degrees perpendicular to the gradient. The importance of orientation data increases as the probe's length increases. Software correction can be done to reconstruct the gradient when a probe is out of alignment with the gradient, but for the correction to be accurate, the precise tilt must be known. Furthermore, many conventional systems do not have the bandwidth to send tilt, sensor or battery life information back to the user in real-time.

Current HFPs have are limited in use, because they lack significant modularity of their consistent components. For example, only a subset of current HFPs contain removable bow string sensing segments, a necessary requirement to effect repairs while in the field, because probes routinely get bent or broken on insertion of the target medium. All current HFP with removable sensing segments have complex connections for each and every analog sensor wire. In addition, because HFPs are filled with oil, removal of a sensing segment requires draining the oil, re-calibrating, filling the replacement segment with oil and reassembling the device. Calibration must be performed in highly controlled laboratory conditions and involve a large water bath stepped heating test, which is not possible to perform at sea and get meaningful data for proper calibration. A HFP with a simple connector would enable users to quickly change out the sensing segment, with no need to drain and refill oil, or re-calibrate the sensors. New sensing segments are needed in the case of damage to a segment, or if the user wished to use a sensing segment with more or less sensors, or switch to a sensing segment for a completely different physical gradient. In addition, modularity of the electrical components in HFP would greatly increase probe functionality. Currently, HFPs lack easy removability of their controller, logger or battery components. With modularity, a user can remove the controller and easily transport it to another location, for use with other probes. With modularity, a removable battery greatly reduces downtime due to battery re-charging.

Accordantly, there is a need, particularly in research and in the oil and gas industry, for a modular, high-resolution gradient sensing probe to provide accurate and real-time data on physical gradients in marine sediments.

SUMMARY OF THE INVENTION

An object of the present invention is to provide an improved gradient sensing device which is more readily configurable to measure gradients of one or more selected modalities.

Another object of the invention is to provide more cost-effective, more accurate and/or higher-resolution gradient measurements in real time.

This invention features a gradient sensing probe system, also referred to herein as a device for the sensing of physical gradients, and method of using same, including a sensing segment with a plurality of sensors such as a high-resolution gradient-sensor array, a support structure, and an electrical interface. The device further includes a housing, a power source, an electronics package including a controller and disposed within the housing and including an electrical interface having at least first and second faces, the first face attached to the first support structure and connected to the plurality of sensors, and the second face attached to the housing and connected to the electronics package. The two faces establish fewer connections to the housing than the plurality of sensors in the sensing segment and said two faces connect together to form uninterrupted connections through the electrical interface. The plurality of sensors are configured to measure external gradients and to exchange data with the controller.

The power source is connected energetically to provide power to the high-resolution gradient-sensor array, the controller, and the electronics package, and is controlled by the controller.

In one embodiment, the sensing segment is configured on the support structure to transmit heat external to the probe and to record external temperature gradients and to exchange data with the controller. In certain embodiments, the device includes a tilt orientation system, connected to the controller and power source. In a number of embodiments, the device further includes a communications system, connected to the controller and the power source, wherein the controller is capable of exchanging data with an external location through the communication system. In one embodiment, the device includes a sensor converter located within the first support structure and connected between the first electrical interface and the plurality of sensors, and wherein the sensor converter addresses information relating to the sensors and transmits it between itself and the controller according to a communications protocol.

In some embodiments, the device further includes (i) at least one module receiver and at least one module electrical interface, wherein the module receiver forms a cavity in the housing to reversibly receive a module, and (ii) at least one module comprising a second electrical interface, wherein the second electrical interface forms a connection to the at least one module electrical interface, and wherein at least one of the power source, the controller, and the electronics package is disposed within the module and connected to the second electrical interface. In one embodiment, the electrical interface contains fewer connections to the housing than sensors in the sensing segment. In certain embodiments, the communication system is capable of sending and receiving information through water to a remote communication device. In one embodiment, the sensing segment is reversibly attached to the housing. In one embodiment, the electronics package is reversibly detachable from the housing. In certain embodiments, the sensing segment further comprises an output mechanism that is connected energetically to the power source and operatively connected to the controller.

In one embodiment, the device further includes at least one support connection, a segmented second support structure comprising at least two segments and at least one segment connector, wherein the at least one support connection is connected to the first and second support structures, the at least two segments are interconnected to the segment connector, and the second support structure is connected to the housing. In certain embodiments, the device further includes at least one penetration section, wherein the second support structure comprises an end distal to the housing, and the at least one penetration section reversibly attaches to the second support structure distal end.

This invention may also be expressed as a method of measuring a gradient in a target medium by selecting a gradient sensing device including a controller, a housing, a sensing segment, a power source, and an electronics package disposed within the housing and including a tilt orientation system, a communications system, and an electrical interface. The method includes placing the gradient sensing device in proximity to the target medium, and operating the sensing segment to measure the gradient in the target medium.

In certain embodiments, the communication system is capable of sending and receiving information through water to a remote communication device. In some embodiments, operating includes remotely changing at least one operational parameter of the gradient sensing device, including at least one of activating individual sensors, deactivating individual sensors, and measurement time. In one embodiment, the sensing segment further includes a output mechanism and is operated to stimulate a gradient in the target medium, and the gradient sensing device changes at least one operational parameter, including externally transmitted heat pulse duration, delay and intensity.

BRIEF DESCRIPTION OF THE DRAWINGS

In what follows, preferred embodiments of the invention are explained in more detail with reference to the drawings, in which:

FIG. 2C is a schematic partial side view of one implementation of the sensing segment of an embodiment, comprising an oil-filled sheath, an output mechanism, a plurality of sensors, a plurality of sensor connections, and a plurality of securing mechanisms;

FIG. 2D is a schematic partial side view of one implementation of the sensing segment of an embodiment, comprising a plurality of serially connected sensors, all connected to a single input connection and a single output connection and both connections interconnected directly to the sensing face of the electrical interface;

FIG. 3 is a schematic side, partial cross-sectional view of the converter manifold of one embodiment of the Gradient Sensing Device;

FIGS. 6A-6B are schematic perspective and top partial cross-sectional views of the standoff assembly according to one embodiment of the invention;

FIGS. 6C-6D are schematic end and side views of a strut for the standoff assembly of FIGS. 6A-6B; and FIG. 7 is a flowchart illustrating operational control of an embodiment of the invention, including storage, deployment, gradient sensing, and recovery.

DEFINITIONS

Figure 1B:
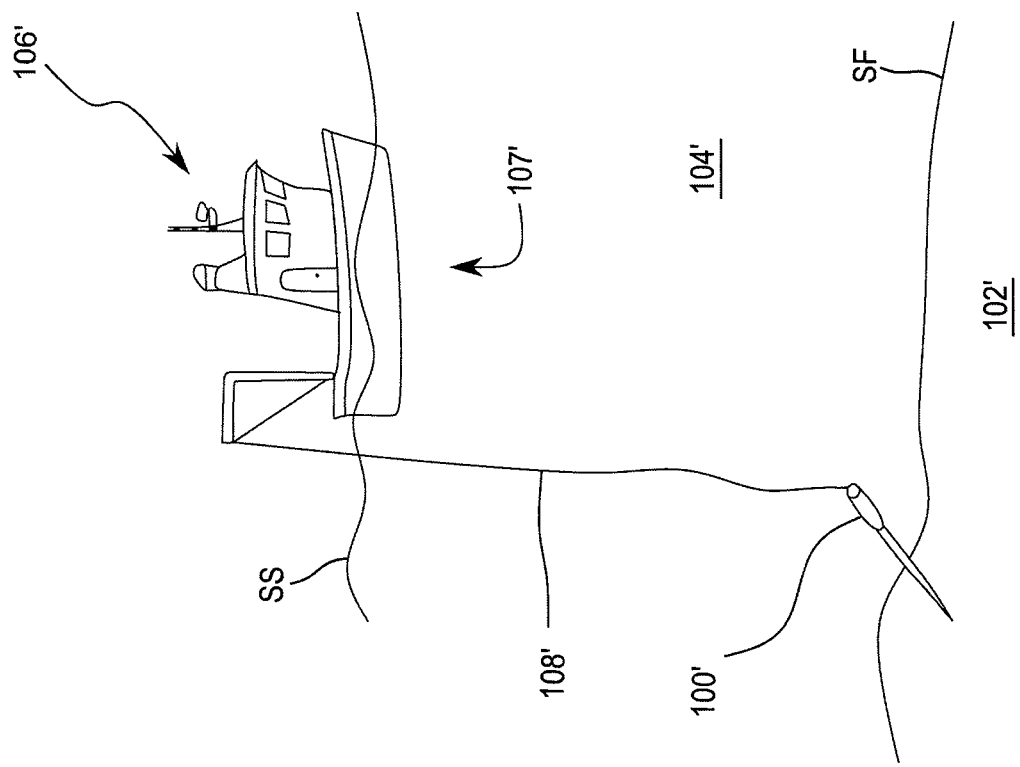
FIG. 1B depicts the Gradient Sensing Device with a suboptimal penetration during deployment.

Waterproof. As used herein, the terms "waterproof," "water-tight," and "fluid-tight" describe the ability of a construct to withstand the entry of water or other fluid. The water may be fresh water (e.g. from a lake), salt water (e.g. ocean water) or other water-based fluid. Unless otherwise stated, the term waterproof also denotes pressure resistant, and a pressurized container, capable of withstanding external pressures that correlate with any depth up to 6000 meters of water depth.

Support structure. "Support structure" as defined herein refer to physical structure that defines (e.g. houses or supports) parts of the inventive device and are referred to as "support structure" or a simply "support". A support structure is a physical construction in or on which the sensing segment is located. In some embodiments, a support structure also houses parts of the invention. In the instant invention, the first support structure supports the sensing segment, and the sensor array and output mechanism are housed within the first support structure. The first support structure may be constructed in any shape as to best measure the target gradient (e.g. a linear "spear" or "dart," or a planar box). The second support structure is defined herein as an optional structure aligned besides the first support structure of the sensing segment for the purpose of adding strength and support to the first support structure during system operation, especially during penetration into the target medium.

Output mechanism. The output mechanism provides the ability to convert electrical energy from the power source to a desired output. And is configured to transmit the output to the penetrated medium when the system is embedded in the target medium. In different embodiments, the output mechanism may emit a different type of output, usually electromagnetic in nature.

Electrical interface. The electrical interfaces allows for digital information, data and commands to pass between two water-tight components. Electrical interfaces include two faces with at least one connection that is connected, or otherwise uninterrupted when the two faces are affixed to each other, such as by male-female type interconnection. Electrical interfaces may connect data, electrical, optical and sound connections.

Tilt orientation system. In this disclosure, "high-resolution tilt orientation system," "tilt orientation system," "tilt system," and "orientation system," and the like refer to the system by which the inventive device detects the precise three-dimension position, relative location and the degree away from vertical of the device as a unit of time.

Communications system. In this disclosure, "communications system" refers to any device that sends and receives digital information or computer coded information between the device and the remote station. Communications systems may comprise a physical connection between the device and the station as in an optical fiber or copper wire incorporated into the device's tether. In other representative embodiments, the communications system of the invention comprises an optical modem, an acoustic modem, with or without an accompanying physical connection between the device and the remote station Sensing segment. The "sensing segment" is the component of the device that is responsible for measuring the gradient in the penetrable medium. The sensing segment includes at least a first support structure, a sensor array, a sensor converter and a face of the electrical interface. An output mechanism is included in some embodiments. The sensing segment is connected at least to the housing by the completed electrical interface and can be constructed in any fashion such that allows for optimal gradient measurement. The sensing segment may further be connected to a second support structure.

Transmit output externally. Some embodiments of the device transmit an output from inside the first support structure of the sensing segment to the exterior of the device. In some of these embodiments, an output mechanism, often a copper wire, is connected to a power source such that the output mechanism becomes instantaneously hot, thermodynamically heats the first support structure and then the surrounding external medium. This heating process is referred to in this disclosure as "transmitting heat," "transmit heat externally," "external heating," or "heating".

External station. In this disclosure, "remote station," "external station," "station," "surface vessel," "surface vehicle," and the like refer to the location of the user or a platform, often times a vessel, but can also include underwater or surface AUVs, ROVs, buoys, stationary platforms, docks, airplanes, and the like.

High-resolution gradient-sensor array. In this disclosure "high-resolution gradient sensor array," "high-resolution sensor array," "sensing array," "sensor array," and the like refer to an array of densely packed sensors connected to a sensor converter and constructed in such a fashion to record a physical or chemical gradient along the sensor array.

Controller. The term "controller" in this disclosure refers to any electronic or digital controlling system, often a computer or a circuit board-based processor. The controller is capable of being programmed by a user prior to construction of the device as well as during deployment. The controller performs most if not all of the common control functions, including receiving digitized sensor output and storing the output to memory and sending the output to the station via the interconnected communications system. The controller may include a central processing unit (cpu), random access memory (RAM), long-term memory storage, and optional analog to digital converters.

Planar. In some embodiments, the sensing segment may be constructed with a planar design. In this disclosure, "planar" refers to a three-dimensional, box-like construction. The box may be constructed to have a low relief in regards to the top to bottom dimension, and may be constructed in an angular shape facilitate flow through a medium (e.g. water).

Sensor converter. The "sensor converter" or "sensor output converter" is a controlling device that converts analog signals received from the plurality of sensors in the sensor array to a digital signal. The sensor converter sends digital commands to the connected controller.

Target medium. The instant invention is designed to measure a physical or chemical gradient in a sediment, medium, or other environment of interest (e.g. ocean bottom sediment). In particular, the instant invention is configured to measure the gradient after penetrating into the medium, which may be referred to as the "target medium," "penetrable medium," "medium to be penetrated," "target penetrable medium," or "medium".

Physical Gradient. A gradient is, the multidimensional rate of change of a given function. More plainly, a gradient is the change of a property over a dimension. For the purposes of this disclosure, a gradient is the change of one or more properties of nature over a distance in space, typically along two points in space, defined by the beginning and end of the device's sensor array. The properties of interest here are physical and chemical. Physical gradients refer to gradients of any measurable physical properties (i.e. characteristics of) a medium. These properties include but are not limited to temperature, thermal conductance, magnetic field, magnetic flux, pH, capacitance, conductivity, concentration, density, elasticity, permeability, and the like.

Figure 2A:
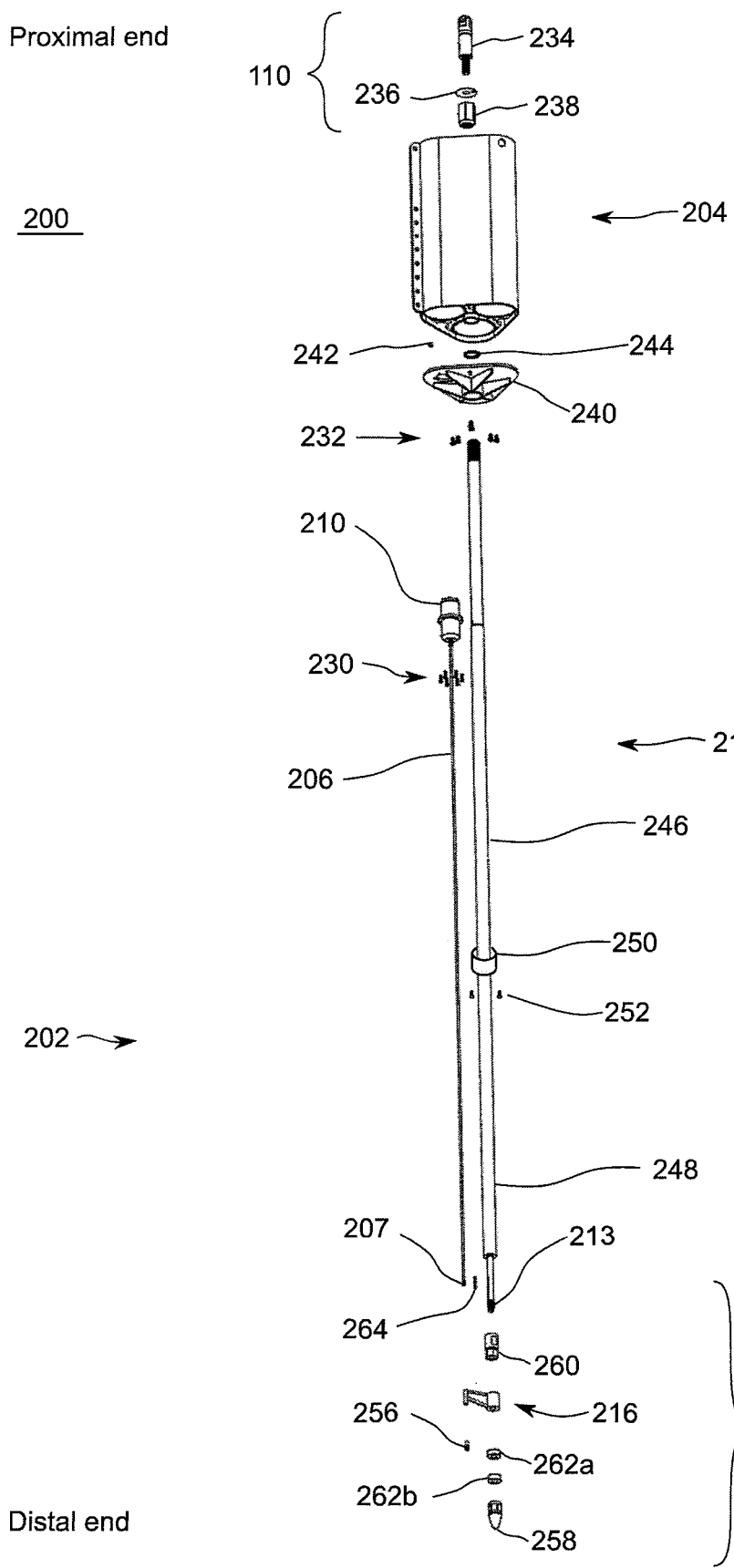
FIG. 2A is an exploded side view of one construction of the Gradient Sensing Device in a linear configuration.

Proximate and Distal Ends. For the purpose of this disclosure the proximate end of the device or of a single component is considered the end closed to the tether attachment point 110. The distal end is the end of the device or of a single component that is farthest away from the tether attachment point. FIG. 2A provides proximate and distal end labels in relation to one embodiment of the device.

DETAILED DESCRIPTION OF THE INVENTION

Overview

The systems and methods described herein will now be described in detail with references to illustrative embodiments. The described features, advantages, and characteristics of the invention may be combined in any suitable combination in one or more embodiments. One skilled in the relevant art will be aware that the present invention may be practiced with or without one or more of the specified features or advances present in a particular embodiment. In some cases, features and advantages may be present in some embodiments that are not present in others. These illustrated embodiments are for the purpose of describing the inventive system and methodologies and are not to be understood to be limiting in any way.

In some constructions according to the instant invention, the Gradient Sensing Device functions as a Heat Flow Probe ("HFP") for measuring thermal conductivity of sediments and other soft, penetrable solids. Like previous HFPs, in operation, it is plunged into ocean bottom sediments. Heat is then measured passively by means of a thermal sensor array positioned along the length of the heat sensing surface(s) of the probe. In many embodiments, the probe also has an internal output capability to transmit an electromagnetic output (e.g. heat) into the surrounding sediments so that the subsequent time course of dissipation of the output may be monitored by the sensor array.

The inventive thermal Gradient Sensing Device disclosed herein offers several improvements over existing HFP technologies. The improvements include: 1) high-resolution (signal/unit area and sub milli-degree temperature resolution) sensor arrays, 2) high-resolution tilt system, 3) real-time underwater wireless communication and control, and 4) modularity. Features enabling these capabilities include: an innovative master analog-to-digital converter in the modular sensing segment; a highly sensitive tilt orientation system; an acoustic, underwater communications system; and an innovative, modular design that supports high density sensor array, electronics package and power source.

This invention comprises a system and a method including a high-resolution gradient-sensor array arranged on a support structure. The system further includes components that enable the capture, analysis and communication of high-resolution gradient data, as not possible heretofore. Central to invention's performance capabilities are the sensor array, sensor converter, electrical interface, optional tilt sensor, controller and optional communications system. The sensing segment is configured on the support structure to transmit an output (e.g. heat) external to the probe and to record external gradients (e.g. temperature) and to exchange data with the controller. The controller is capable of exchanging data with an external location (e.g. the linked surface vessel) through the optional communication system.

The power source is connected energetically to provide power to the high-resolution gradient-sensor array, the controller, and the electronics package, and is controlled by the controller. The optional high-resolution tilt orientation system is operatively connected to the controller. The connectivity of these components is enabled across modular sections of the instant invention by electrical interfaces, when present.

Unlike conventional seismic streamer sensors that also sense a gradient, the output mechanism and sensor array of the present invention preferably are entirely contained inside a single, contiguous, and usually rigid sensing segment. Conventional seismic streamers typically contain one emitter that produces a signal (often an air gun) and a streamer of hydrophones. The hydrophones are arrayed on long, flexible lines that measure the signal reflected from different features of the ocean subsurface. The target medium is therefore the ocean bottom, but the medium the stream is deposited in is the ocean water, very near the surface (typically the first one meter of depth).

Figure 1A:
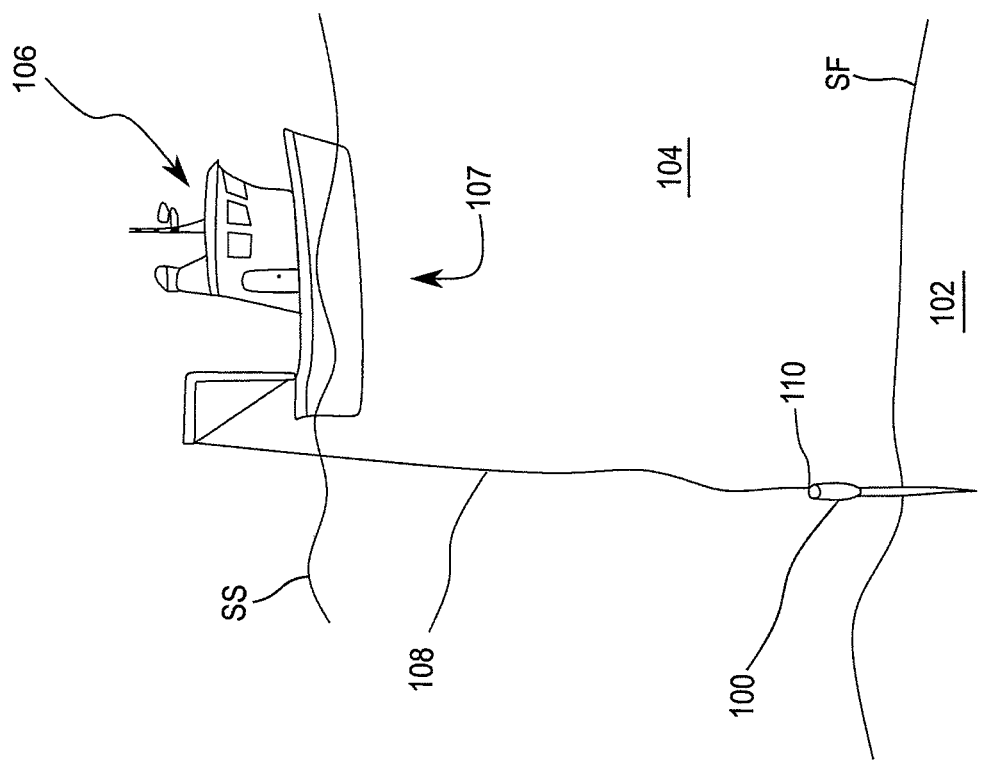
FIG. 1A is a schematic side view depicting a Gradient Sensing Device according to the present invention deployed from a vessel at a remote station with an optimal penetration of marine sediments.

Use of a gradient sensing device 100 is illustrated in FIG. 1A at a station 107 with a desired, substantially vertical insertion into a target penetrable medium 102, such as subsea sediment. A less-optimal, tilted orientation for the gradient sensing device 100' is illustrated in FIG. 1B at station 107'. Illustrated in both FIGS. 1A-1B are a fluid 104 such as seawater establishing a water column between sea surface SS and sea floor SF, a platform 106 such as a vessel, and tethers 108 and 108' connected between the devices 100 and 100' and the vessels 106 and 106', respectively.

Device 200 shown in more detail in FIG. 2A with a sensing segment 202, a housing 204, a first support structure 206 and an optional second support structure 212 connected to first support structure 206 by one or more mechanical support connections (also referred to herein as stand-off assemblies) 216 such as a strut.

Figure 2B:
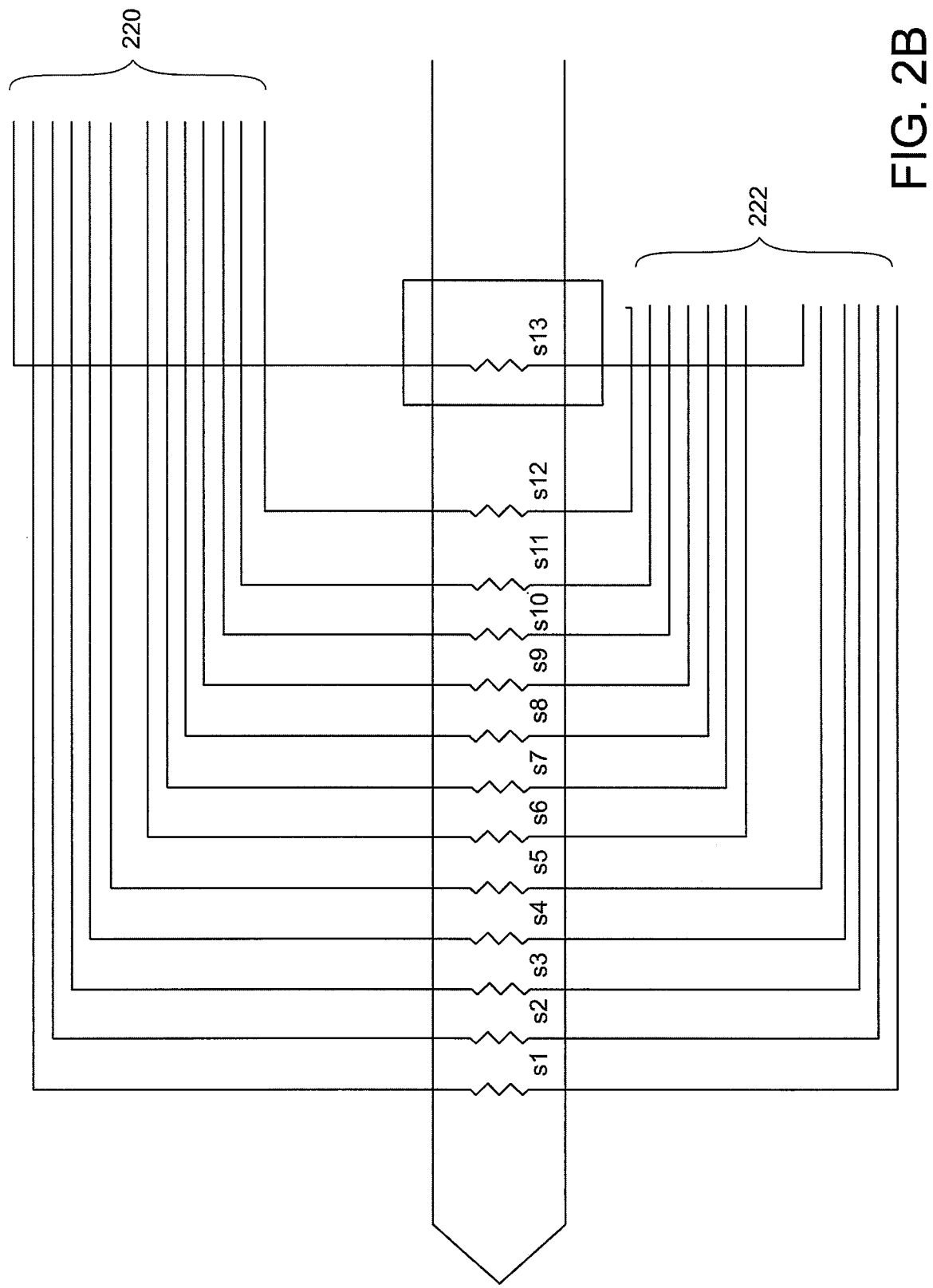
FIG. 2B is a schematic partial circuit diagram of the sensing array of the Gradient Sensing Device of FIG. 2A.

The sensing segment 202 is shown in more detail in FIGS. 2B and 2C, having a sensor converter 320, a high-resolution gradient-sensor array 208, an output mechanism 224, and a face of the electrical interface 326. A circuit diagram of the sensor array is shown in FIG. 2B, depicting the one embodiment having 14 sensors (s1-s14), each with an input connection 220 and an output connection 222. The gray box denotes the last reference sensor, which is kept at a constant resistance for reference and calibration. A cutaway of one construction of sensing segment 220 is illustrated in FIG. 2C showing the interior of first support structure filled with oil OF and carrying thermistor wires to sensors s1-s6 (only 6 sensors are shown purely for illustrative purposes) and the output mechanism 224. In addition, the sensor wiring is bundled by series of securing means 226a-d and further wrapped in a protective sheath 228. Of note, the sheath is not fluid tight to the surrounding oil. Preferably the oil is in direction contact with the sensors and the interior wall of the first support structure.

The optional converter manifold is illustrated in FIG. 3, having a housing 302, an end cap 304 and containing the sensor converter 320 and a face of the electrical interface 326 plus connections interconnecting these components and the sensor array 208. The converter manifold provides a watertight environment to house and support the sensor converter. Some embodiments do not have a converter manifold, and instead the sensor converter is located in the first support structure. The converter manifold is made watertight by end cap sealing mechanism 306a-b, as well as fittings 308 and sealing mechanism 310.

Figure 4:
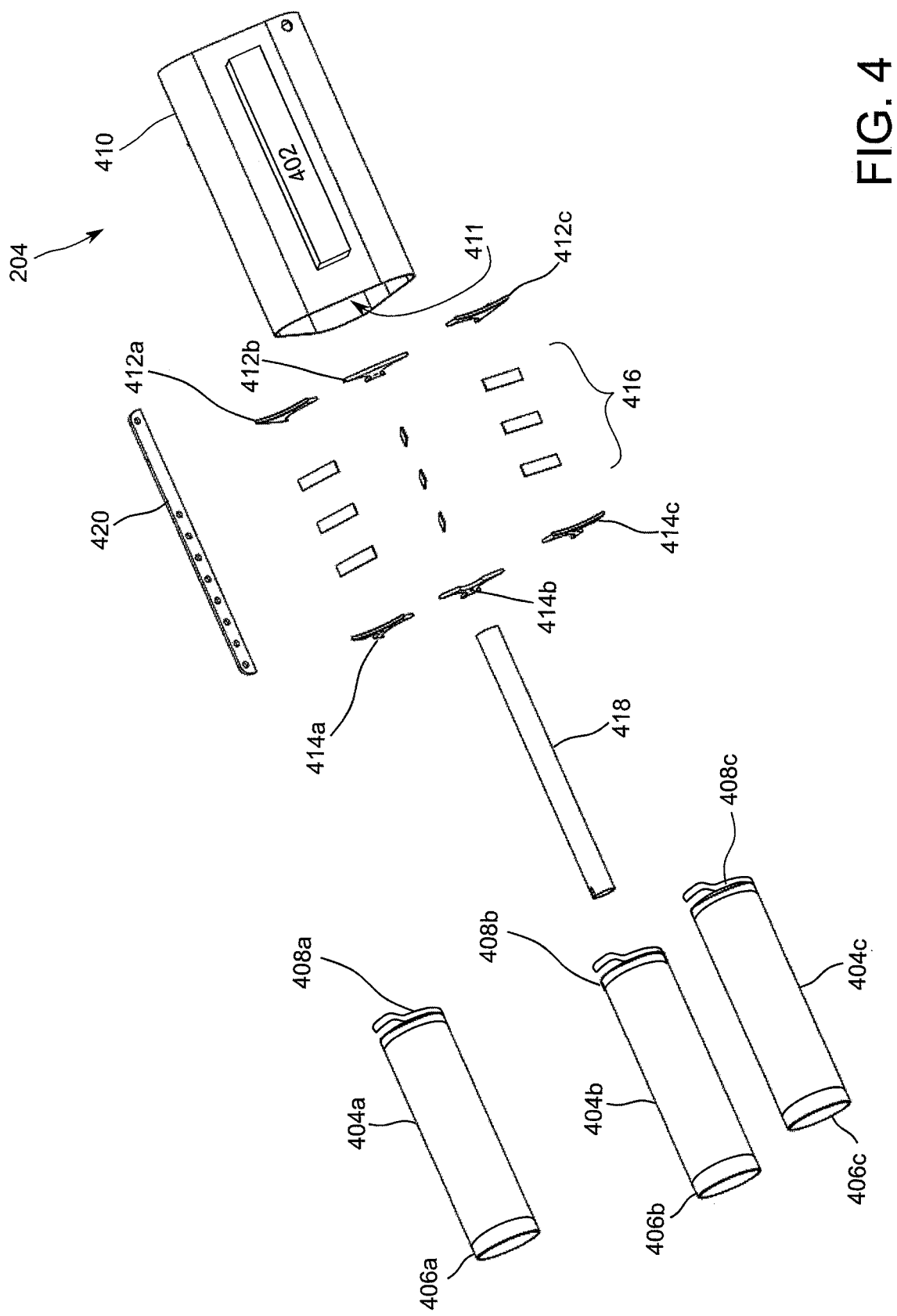
FIG. 4 is an exploded perspective view of the housing interior of one construction of the Gradient Sensing Device, containing controller, electronics, and power source modules.

A representative embodiment of the housing 204 is illustrated in FIG. 4, with one or more of a buoyancy control system 402, and modules 404a-c. Each module further comprises electrical interfaces 406a-c and release mechanism 408a-c. Each module may further house additional components. The modules' contents and their function are described in more detail below.

Additional configurations are illustrated in FIGS. 5A-5D. Housings 204a, 204b, 204c and 204d, respectively, provide support and housing for modules with different combinations of components. Module 500, with electrical interface 504, and release mechanism 506, further comprising a controller 508. Additional module 520, comprises an electrical interface 524, a release mechanism 526, a tilt orientation system 528, and a communications system 530. A third module 540 comprises, an electrical interface 544, a release mechanism 546, a power source 548, and the communications system's baffle 550.

Figure 5B:
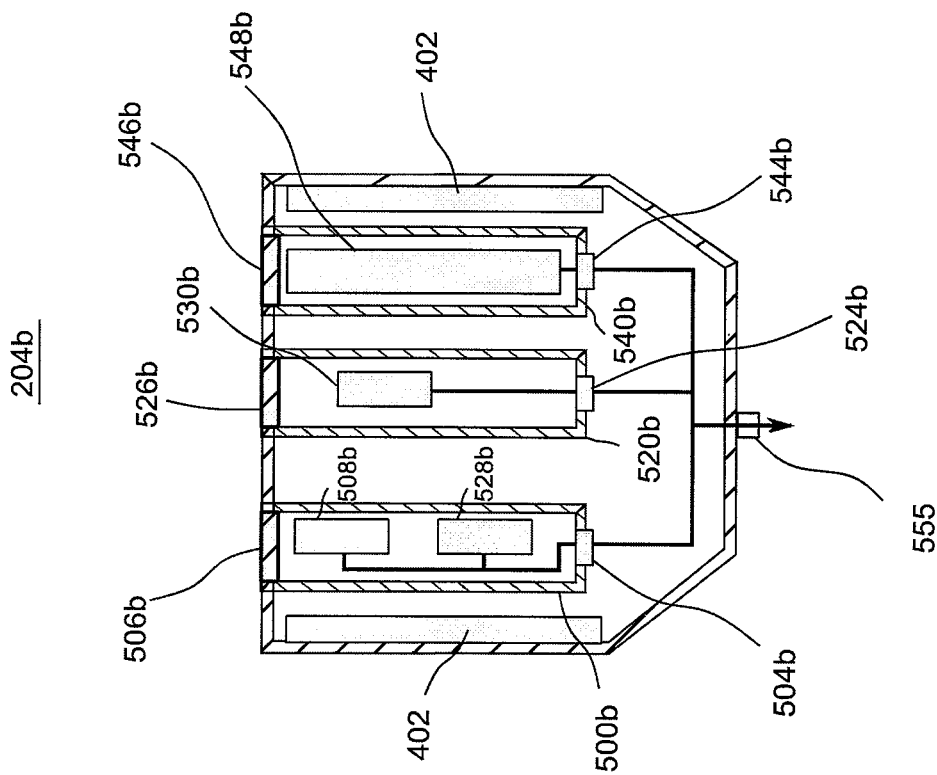
FIGS. 5A-5D are schematic partial cross-sectional views of housing interiors of four embodiments of the Gradient Sensing Device, including modules further comprising different combinations of a power source, a controller, an electronics package, a communications system, and/or a tilt orientation system.
Figure 5A:
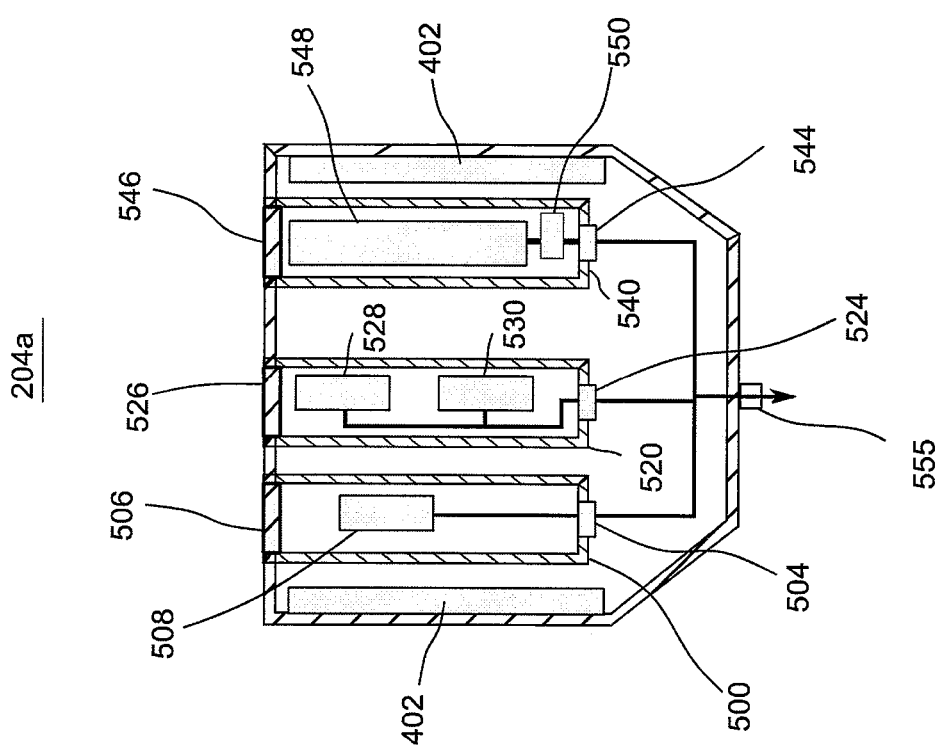
Figure 5D:
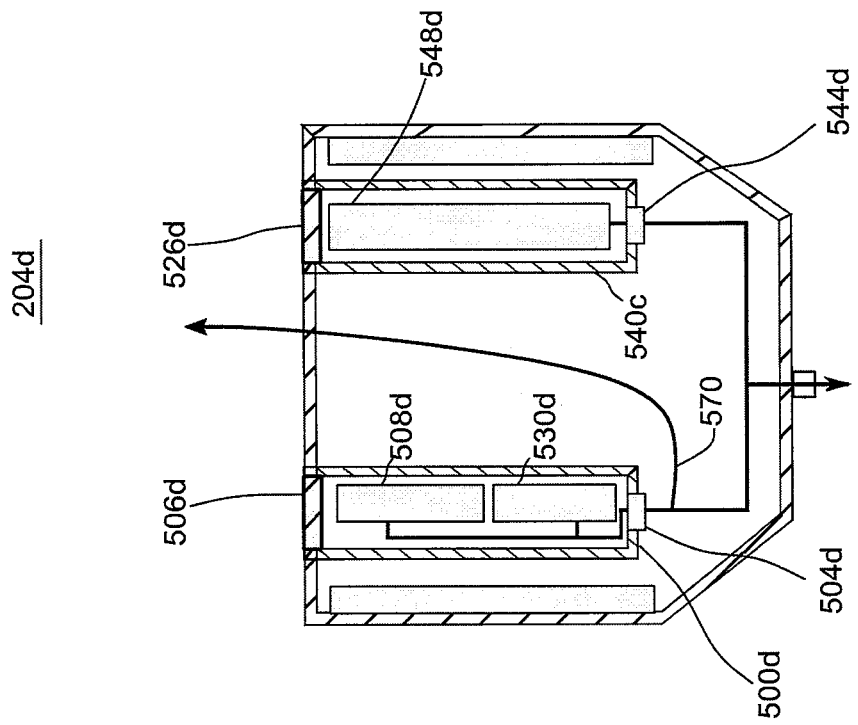
Figure 5C:
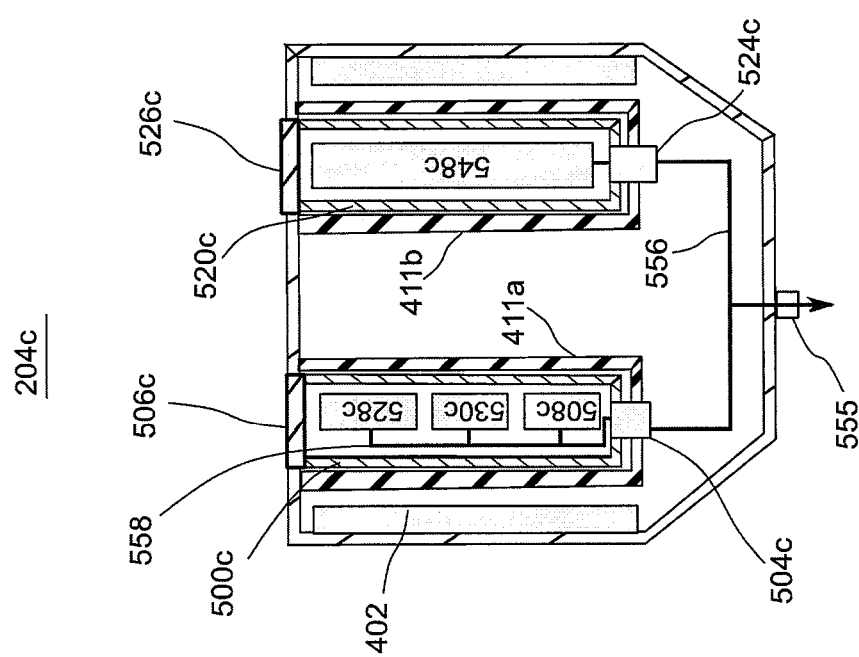

In an additional embodiment illustrated in FIG. 5B, the module 500b that holds the controller 508b also holds the tilt orientation system 528b. A second module is provided and comprises the communications system 530b. And a third module comprises a power source 548b. Yet another embodiment, FIG. 5C, is an example of an embodiment comprising only two modules 500c and 520c. Module 500c comprises controller 508c, tilt orientation system 528c and communications system 530c, while module 520c comprises power source 548c. A fourth embodiment, FIG. 5D, is an example of an embodiment with a hard-wired (non-wireless) communication system. Module 500d comprises controller 508d and tilt orientation system 528d, while module 520d comprises the power source 548d. Communications tether 570 is interconnected with housing internal data connection 556, which is connected to the modules by the electrical interfaces 500d and 520d. The electrical interfaces are further interconnected by module internal wiring 558, completing the data and power connection to the module's components. These components are described in more detail below.

Sensing Segment

Overview The inventive Gradient Sensing Device comprises a modular sensing segment that is configured to be embedded into a medium, and measure a gradient there within. The sensing segment is the portion of the submersible system responsible for measuring the physical and/or chemical gradients occurring in penetrable materials. The sensing segment comprises a spatial array of sensors capable of obtaining multiple simultaneous measurements of the adjacent target medium and relays the acquired data to the controller. In the currently preferred embodiment, the sensing segment comprises an array of thermal detectors (e.g. thermistors) for the measurement of heat flow across the span of the sensing segment, typically 6 meters in length. Suitable gradient distances (i.e. the distance covered by the sensing segment) range from centimeters to in excess of several meters, or several tens of meters, such as are found on the fluid body bottoms, for example, marine and lacustrine sediments and deposits. The sensing segment preferably has low thermal mass and minimal medium disturbance (upon penetration). In many HFP embodiments, the sensing segment is designed to generate and transmit heat into the medium for the purpose of measuring heat dissipation using the sensors of the sensing segment.

The sensing segment is comprised of a) a high density, high resolution sensor array, b) an optional output mechanism, c) an electrical interface, d) a sensor converter and e) a converter manifold and f) a first support structure. The sensing segment also comprises one or more mechanical connections to the housing, and, optionally, the second support structure (also referred to as stand offs). In many embodiments, the mechanical connection is detachable to allow the sensing segment to be quickly and easily detached from the rest of the device. Typically, the mechanical connections are secured with reversible connectors (e.g. bolts) that are easily removed, allowing for the sensing segment to become free from the remainder of the device. In cases where analogue output is generated by the sensors used within the sensing segment, the output is converted to digital signals by the sensor output converter. The sensor output converter then transmits the digitized data through the electrical interface (when attached) and to the controller.

The high density, high resolution sensing array is suitably designed and arranged within the sensing segment for the measurement of at least one gradient (e.g. thermal) in the target medium. The sensor array is operatively connected to the digital controller, via the sensor converter, and the electrical interface. Electronic output from the sensors of the sensor array is transmitted to the controller for recording, processing, storage, and/or transmission. The sensor array is configured within or on a first support structure which houses and protects the individual sensor, and along with an optional output mechanism, defines the sensing segment of the inventive Gradient Sensing Device.

The sensors within the array are however sufficiently exposed and/or coupled to the exterior to measure the gradient of interest (e.g., via an oil-filled tube). Typically, sufficient exposure involves a thin walled first support structure filled with an appropriate filler substance, enabling adequate sensing (e.g., efficient transfer of heat), while simultaneously protecting the sensor array from the exterior environment, especially during medium penetration. In the currently preferred embodiment, the filler substance is an oil (e.g., mineral oil), which facilitates the convective transfer of heat from the output mechanism to the penetrated medium as well as from the penetrated medium to the sensors. All components internal to the sensing segment are thus potted in the filler substance. Typically, in situations where the inventive devices will be used in environments with significant hydrostatic pressure (e.g., submersed) the filler substance is pressure resistant (incompressible), protecting the internal components from the external pressure. In the preferred embodiment, the filler substance is less than 10% compressible at least 0 to 6,000 meters.

Activation, attenuation and other control functions to be applied to the sensors within the array or to the heat transmitter are effected through a digital connection to the controller.

High-Resolution Gradient-Sensor Array

The sensors within the sensor array may be arranged in any configuration suitable for the intended measurements. Most often the sensor array is configured as a linear string of sensors ranging from centimeters to multiple meters in length. For example, in some HFP embodiments, the sensors of the thermal sensing array are arranged linearly within a 6 meter first support member (i.e. the sensor probe housing) in a thin "bow string" gradient sensing arrangement which is mechanically supported by an optional second support member.

In preferred embodiments for the HFP, precise, highly sensitive temperature sensors are employed to make up the sensor array. In some preferred embodiments, the sensing array is a series of interconnected thermistors (also referred to as thermoresistors), which are resistors that change resistance in response to the surrounding temperature, for example, TH-10-44000 thermistor, commercially available from Omega Corp, USA, with sensitives at least 0.001 degree Celsius.

The individual sensors are typically analog sensors. The diameter size of the sensing segment should be as small as possible, and small diameter analog thermistors are available. TH-10-44000 come in several sizes, including ⅛ inch diameters, allowing for a sensing segment tightly packed with these thermistors. The individual sensors are connected by a wire or sensor connecting means (also referred to as the "sensor connector"). Each sensor is connected to the sensor converter via a sensor connector. The connecting means comprises any suitable connection as known in the art. In the currently preferred embodiment, the sensor connector is a Teflon jacketed Kynar thermistor wire. Again, sensor connector size is important, and the sensor connector must be small as possible, preferably no more than 0.1 inches, no more than 0.05 inches, no more than 0.025 inches, as in Alpha Wire's thermo resister wire. The connecting means may also be part of a solid-state, printed circuit board.

In some embodiments, the thermistors are arranged in a linear fashion, along the length of the first support structure. Typically, the interior of the sensing segment in such a linear embodiment comprises a series of sensors, each spaced throughout the segment, connecting means (for both supply and return, also referred to as input and output) to each sensor, and the sensor converter, and the output mechanism (typically a copper heating wire). The wires are bundled in a sheath wrapping, secured, and surrounded in a filler substance (FIGS. 2B and 3).

In other embodiments, the sensors are arranged in a grid-like pattern throughout a planar first support structure. The sensors may be spaced such that they measure temperature in the penetrated medium over the entire length of the sensing segment. In some embodiments, the sensors can be evenly spaced along the linear array or throughout two dimensions of the planar array. In other preferred embodiments, the sensors are more densely spaced in an area of the array that may be better situated to the gradient to be measured, for example, packed more densely into the distal portion of a linear array.

In certain embodiments, the sensor array comprises a plurality of digital sensors. The digital sensors may be connected in parallel or in serial. Illustrated in FIG. 2D is an embodiment comprising serially linked sensors s1'-s6', for which the sensor converter is optional, and the connections link directly to the sensing face of the electrical interface 326d for interconnection with the controller. The connections here comprise a single sensor input connection 220d and a single sensor output connection 222d (dotted line), each connected to all sensors. In serially connected embodiments, each sensor communicates in a temporal fashion (e.g. time-division multiplexing).

In some embodiments, the sensor array comprises of a single, printed circuit material (i.e. solid state), incorporating the sensors that make up the sensor array, the sensor converter, the optional output mechanism and conductive connections (i.e. the connecting means) to all present components. The conductive connections therefore replace the supply and return wires in the above, non-solid-state embodiments. The sensor array and sensor converter are printed onto a base, preferably using semi-conductive ink on a suitable, flexible material such as poly(ethylene terephthalate)-foil. The printed sensor array may also include the sensor converter and is then directly connected to the sensing face of the electrical interface of the sensing segment. Alternatively, the base is connected to an output converter that serves as a control board, for interfacing with the electrical interface and the rest of the device. A solid-state embodiment may comprise analog sensors all connected to a printed-on output converter, or may comprise digital sensors, where each is connected to an output converter component that serves as a control board to exchange data and commands. In solid-state embodiments, the output mechanism is also printed onto the base. The base may comprise a single manufacture, preferably flexible, or the base may comprise multiple sections, each section properly connected to the other to pass on the connections.

The inventive system accepts analog signal output from any different number of analog, electrical based sensors. Embodiments that incorporate different types of analog electrical sensors are described further herein.

Sensor Converter

The inventive design of the Gradient Sensing Device allows for many more analog sensors to be incorporated into the sensing segment by implementing a communications protocol between controller, sensor converter and the sensors. A communications protocol is a system of rules that allow two or more components to transmit or exchange information via any kind of variation of a physical quantity (e.g. voltage). The sensor converter receives information following the communications protocol from the controller and, following the rules of the protocol, addresses the information to specific sensors. Additionally, output from each sensor in the sensor array is transmitted to the interconnected sensor converter and is converted according to the protocol rules for digital transmission across the electrical interface to the controller. In most embodiments, the sensor converter is located in the converter manifold 210, which is attached and interconnected to the first support structure. The sensor converter is connected to the sensor array, and to the electrical interface components, and is operatively connected to and exchanges data with the controller and power source in the housing via the electrical interface.

In the currently preferred embodiment, the sensor converter comprises an expandable analog-to-digital processor and converts analog data received from the plurality of analog sensors. In other embodiments, the sensor converter is a communications interface between two digital systems: the controller (through the electrical interface) and the plurality of sensors. The sensor converter receives commands from the controller and addresses the appropriate command to specific sensors. In addition, the data received from each individual sensor is converted to the appropriate data handling format (in accordance to the communications protocol) and is exchanged with the controller along a single connection. Thus, the sensor converter removes the need for individual connections between each sensor and the controller, reducing the number of connection required to be linked through the electrical interface.

The preferred embodiment comprises a sensor converter with at least 16 channels, but may be expanded, typically in units of 16. Preferably, the sensor converter digital processor comprises at least a 24-bit programmable interface controller (PIC) board, which handles the interfacing, or handshaking between all the sensors and the controller in the housing (by way of the electrical interface). The sensor converter converts an analog voltage signal generated from the sensor that is proportional to the physical phenomena (e.g. temperature), to digital information. In a typical embodiment described herein, the analog sensors have a min to max range of about 5 volts (V) output. The preferred 24-bit sensor converter has $2^{24}$ (16,777,216) available informational bits (also referred to as steps, commonly thought of individual spaces that may consist of a 0 or a 1), or discernable positions between the min and max of the sensor. The range (5V) is divided by the number of steps to obtain the sensor's resolution, in this example 5/16,777,216 for a resolution of on the order of micro-degrees Celsius. It should be understood that all analog sensors, for different gradients produce voltages in a range, and that the minimum and maximum will vary with the sensor. In the preferred embodiments, the resolution will typically range from milli- to sub micro-degrees Celsius depending on the specific embodiment.

The limit of sensor converter channels is typically defined by the internal space of the converter manifold available for sensor converter expansion. Preferably, all but one input channel to the sensor converter receive input from individual sensors of the sensor array; the remaining input channel receives input from a sensor external to the sensor array, for measuring a parameter of the external water (e.g. temperature of the water external to the device).

In some embodiments, the sensor converter comprises a LTC 2983 analog/digital converter commercially available from Linear Technology Corp. The sensor converter can accept analog data input from 1, 5, 10, 25, 50, 75, 100, 150, 200 or more analog-based sensors and convert all input to digital output signal.

The sensor converter accepts analog output from a large number of sensors of any electrical sensor type. Different embodiments of the Gradient Sensing Device are constructed with different electrical sensors as listed, in part but not limited to, in Table 1 below, including thermistors, pH sensors, magnetic, ionic strength, conductivity, and vibration. A person skilled in the art will understand how each analog sensor is constructed into the first support member such that it is interconnected with the proper sensor connector and to the sensor converter. The sensor converter allows all of the possible embodiments listed in Table 1 to be built in a high density, high resolution gradient sensing array. Typically, analog sensors comprise a set of wires (typically two, in some cases one or more than two). In the instant invention, the wires are connected to the sensor converter. The connection of the sensor converter to the electrical interface is then a commonly known, simplified, 4-pin digital connection, and not a connection with two, or even one wire per sensor.

TABLE 1

| Analog Sensor | Manufacture | Part | Reference |
|---|---|---|---|
| Thermistor | Omega Corp | TH-10-44000 | herein |
| pH | Hatch | PD1P1 | U.S. Pat. No. 8,758,584 |
| Magnetic | Analog Devices | ADA4571-2 | U.S. Pat. No. 6,211,670 |
| Ion specific electrodes | Topac Inc | NH41501 | US2005/0129575A1 |
| Conductivity | Endress-Hauser | Indumax CLS54 | US2005/0129575A1 |
| Vibration | Analog Devices | ADXL001 | U.S. Pat. No. 7,093,492 |

Converter Manifold

Some embodiments of the instant invention further comprise a converter manifold that provides support and housing to the sensor converter and the sensing face of the electrical interface. In addition, the converter manifold provides the link between the first support structure and the housing. The converter manifold is an optional component. In embodiments that do not contain a converter manifold, the sensor converter is housed within the first support structure. However, because as the number of sensors incorporated into the sensor array increases, the space required for the sensor converter increases, the preferred embodiment further comprises a converter manifold to house the sensor converter. As illustrated in FIG. 3, the converter manifold 210 comprises a watertight housing 302, an end cap 304, end cap sealing mechanisms (e.g. o-rings) 306a-b.

The converter manifold and first support structure are joined together by a threaded end of the first support structure 206 and a fitting 308. The fitting is then threaded for connection into a threaded hole into the converter manifold housing 302 and sealed by a sealing mechanism 310. In the currently preferred embodiment, the fitting comprises a modified SS-600-1-6RS Swagelock fitting and the sealing mechanism comprises a SS-6-RS-2V Swagelock seal. The converter manifold end that connects to the housing is further sealed by a manifold-housing sealing mechanism 310 and in the preferred embodiment, comprises an o-ring. The converter manifold is further attached to the first support mechanism by a reversible attachment mechanism 320. In the preferred embodiment, the reversible attachment comprises six alloy steel sock head cap screws.

In the preferred embodiment, the sensor converter interface 320 is located in the interior of the converter manifold and accepts output from the sensors, as well as provides input to the sensors, as represented by a single connection line 322 in FIG. 3 (the connection line and sensors within the first support structure are not depicted for simplicity), and as input connections 220 and output connections 222 in FIG. 2B. The physical dimensions of the converter manifold is may be constructed as desired. Dotted line EZ denotes the optimal location for the manifold to be expanded, during manifold manufacture.

Electrical Interface

Digital information (data and commands) and power are transmitted to the sensing segment through the electrical interface 326, FIG. 3. The inventive electrical interface contains a simple digital connection, with connections allowing for bidirectional power, and bidirectional data transfer (e.g. a four-pin or a eight-pin connector). The electrical interface comprises two connection faces, the first face 326 attached to the sensing segment (also referred to as the sensing face 326) at the first support structure and interconnect with the sensor converter, by means of data connection 324. The second face 555, FIGS. 5A-5C, is attached to the housing (also referred to as the housing face) and interconnected to the controller by the housing internal data connection 556. Each face comprises matching pins and sockets such that electrical, optical and data links are uninterrupted from one face to the other when interconnected (plugged in). The faces of the interface produce a water-tight seal in the component they are attached to and interconnected through. As illustrated in FIG. 3, the sensing face 326 forms a watertight seal with the converter manifold end cap 304. As illustrated in FIG. 5C, the housing face 555 forms a watertight seal with housing 204c. For simplicity the two faces are referred to together as the electrical interface.

In most preferred embodiments, the electrical interface contains less pin connections to the housing than there are individual sensors in the sensing segment. The inventive Gradient Sensing Device not only overcomes the previous sensor limitation by incorporating the sensor converter, but also passes any type of data through the sensor converter and then through the electrical interface, allowing for different embodiments to contain analog sensors for practically any physical gradient, or a single embodiment to utilize multiple sensing segments over time, to measure different physical gradients. In the preferred embodiment, the electrical interface is secured by the converter manifold housing 310, and forms a connection there through, completing a data connection 324 from the sensor converter to the housing and the interconnected controller.

Conventional HFPs utilize a single controlling board. This board converts the analog signals from the sensors after sensor wiring from each sensor is routed through a complex electrical interface to the controller. The complex interface of the previous devices have limits of the number of analog wires that could be threaded through, thus limiting the number of analog sensors and therefore limiting the probe's physical dimension resolution (i.e. sensor spacing). For instance, HFP of the art are limited to less than 12 thermistors, because they contain a 24 pin connector. Each thermistor has two wires (and therefore require two connectors each), and two are taken by the heating wire, resulting in a maximum of 11 thermistors. In addition, the complex electrical interface introduced significant electrical interference (signal noise) between the analog wires, with increasing noise as the number of connections increased.

Bulkhead connections (between sensing segment and housing) of the art are complex, and require a greased connection. In addition to noise stemming from the complex connection (wire shielding noise), a greased connection introduces changing levels of noise during use, from uneven grease, wear on the connection, and dirt buildup (especially when the grease or dirt is uneven). The noise is furthermore complicated by user to user variation, depending on the upkeep skill of the operator, making later data interpretation difficult. The inventive electrical interface overcomes the previous sensor limitations, reduces signal noise by reducing complexity, eliminates the need for a greased connection, and reduces the thermal mass of the internal components (e.g., less copper wiring).

Additional, optional electrical interfaces may be incorporated elsewhere in the inventive device. For example, the housing may comprise a first face of an interface and a module bottle comprise a complementary face. These connections are also referred to as electrical interfaces and behave in a similar fashion as above, and commonly known in the art. However, the number of connections in one interface may be different from another interface.

Output Mechanism

In some embodiments, the gradient sensing unit further comprises an output mechanism (e.g. a heater), which allows the system to produce a measurable change in the environment. The change is then measurable by one or more of the sensors of the device. The output mechanism may enhance, promote, stimulate, or otherwise aid in the measurement of the gradient to be measured. When present, the output mechanism is operatively connected to the digital controller and power source, such that it receives electrical current from the power source and precise commands or other information from the digital controller.

The functionality of the output mechanism differs in the different embodiments. In the Heat Flow Probe embodiment, the output mechanism comprises a linear heating element and allows the system to measure a detectable change of temperature within the medium. Precision thermal gradient formation in conjunction with high resolution thermal detection, marks a significant improvement over previous technologies currently available. Details of other output mechanisms for modalities other than heat are described with their respective sensors below.

In preferred heater embodiments for the heat flow probe, highly efficient heating elements are employed allowing minimal current expenditure to effect the necessary sediment heating. The heating elements draw power from the power source, and is controlled in millisecond intervals by the interconnected controller. The controller specifies the amount of amperage, wattage, and duration of the heating pulse to be conducted from the power source, to the heating elements. In some embodiments, the heating element is one continuous, bare, 18-gauge 60% Nickel/15% Chromium allow heating wire, available from Omega Inc, USA (NI60-040-200).

Additional Output Mechanism

The inventive Gradient Sensing Device accepts data from a number of different electrical-based sensors, described herein. To stimulate a proper gradient, some embodiments have a further optional output mechanism, for example the HFP's heating mechanism. Some embodiments do not require any additional output mechanism, for example embodiments containing pH, ion specific electrodes. Other embodiments, such as electromagnetic sensing embodiments, contain output mechanisms. Embodiments for detecting light and refractive gradients contain a light output mechanism, for example, a light-emitting diode (LED). Acoustic gradient and acoustic refractive gradient embodiments contain an acoustic output mechanism, such as a hydrophone. In some embodiments, the acoustic output mechanism may be combined with the communications system.

First Support Structure

The configuration of the sensor array and optional output mechanism are maintained by a first support structure. The purpose of the first support structure is to: a) provide structural integrity to the sensor array and output mechanism so that during penetration of ocean bottom sediments by the gradient sensing device, these elements retain their functionality and configuration, b) provide interface connectivity with the remainder of the device, and c) to provide water resistance during use.

Provide structural integrity. The first support structure houses the sensor array, sensor converter and optional output mechanism. The first support structure may be constructed in any configuration suitable for the intended measurement. In a preferred embodiment, the first support structure is a thin, linear bow string. In embodiments where a second support structure is used, the first support structure may be physically supported and or reinforced by one or more attachments to the second support structure. Generally, the support structure will be manufactured from rigid material capable of meeting the requirements of the device during use, described further herein. Typical load requirements are 0.01, 0.05, 0.1, to 0.5 net tons. In embodiments with a second support structure, the first support structure is constructed and connected to the first support structure as described herein.

Typically, the first support structure have as small a diameter as possible, and therefore, the reinforcing material used is preferably as thin as possible. A thick support structure would not allow the physical gradient in the external environment to be monitored by the sensor array. Enabling smaller diameter support structures are high strength materials (e.g. steel) and the use of analog sensors (which are often smaller than their digital counterparts).

In other embodiments the sensing segment has a planar construction. In these embodiments, the first supporting structure is defined by the electrical interface connected to the housing on the top a relatively flat, two-dimensional planar box first support structure. Both linear and planar embodiments are constructed with materials suited for withstanding the use environment while allowing for gradient measurement. Different embodiments are constructed with different degrees of reinforcement, relative to the density or composition of the penetration medium. Embodiments penetrating dense (e.g. rocky) mediums are constructed with a suitable amount of durable metal, as described herein.

Provide interface connectivity. The first support structure is connected to the innovative electrical interface described herein. In the preferred embodiment of the heat flow probe, the sensing segment comprises a linear first support structure. Whether constructed in a linear or planar design, the proximal (in relation to the housing) end of the first support structure contacts the electrical interface, which is then directly interconnected to the housing. In the preferred embodiment, the first support structure comprises the sensing face of the electrical interface. In other embodiments, the first support structure interconnects with the converter manifold, which in turn comprises the sensing face of the electrical interface.

Water resistance. The sensing segments is water resistant and capable of withstanding depths up to 6000 meters. General considerations regarding water proofing and pressure resistance are described elsewhere herein and may be applied to the sensing segment as is known by skilled practitioners.

Additional Gradient Sensing Probes

Chemical gradient sensing probes and electromagnetic sensing probes are considered to be within the scope of the invention. These include arrays for sensing parameters selected from the group including Magnetic, Ionic strength/chemical/conductivity, pH, light, water, sound/acoustic and vibration. Sensor arrays for these gradients all share the commonality of analog output. The Gradient Sensing Device can be constructed with any analog sensor know in the art interconnected to the described sensor converter such that the device measures the gradient.

Housing

Control, communication, weight, and some optional sensor elements are most often contained within the housing unit segment and wherein the electronics package is disposed within the housing.

The housing of the inventive device in most embodiments provides a waterproof environment comprising at least one module receiver, electrical interfaces and an optional buoyancy control system used to drive the invention into the penetrable medium. The important components that are described as within the housing, further reside inside modules, often as pressurized, pressure-resistant bottles. At a minimum, the modules must contain the controller and a power source. In the preferred embodiment, a communications system is present as well, in a separate module. As described below, the grouping inside individual modules is customizable. A buoyancy control system is also often attached in or on the housing to meet the weight requirements for the invention to penetrate the medium. In the preferred Heat Flow Probe embodiment, the housing comprises a) an electronics package module, further comprising the controller, the tilt orientation system, the communications system, b) a buoyancy control module, and c) a power source module. The housing is further operatively connected to the sensing segment (physically by the first support member), the optional second support member, and a surface-bound tether. The tether attachment point 110 may reside at any suitable site on the housing, as will be readily apparent to one of ordinary skill after reviewing the present disclosure.

The overall construction of the housing is also described elsewhere herein and is generally known in the art, such as disclosed in U.S. Patent Publication No. 2017/0131432 by Yang et al. and in Louden 1990 as cited in the Background above. The housing comprises a water-tight skin 404 (e.g. casing or structural housing), which supports and houses the remaining internal components. The skin 404 is attached to a gusset assembly 240, which in turn is attached to the first support structure 202 and optional second support structure 212. Bolts 232 attach the support structures to the gusset assembly 240, and a housing locking mechanism 242 ensures a secure attachment. In the preferred embodiment, the locking mechanism comprises a sprint steal key stock. When the second support structure is present, the attachment to the housing further comprises a thrust washer 244.

Internal to the housing skin 404, are a plurality of housing fillets and reinforcing struts. The fillets and struts hold the modules 408 in place. In the preferred embodiment, the device comprises three modules 408a-c, and six fillets, divided into three pairs; three top fillets 412a-c and three bottom fillets 414a-c. Further module support is provided by a plurality of reinforcing struts 416. The number of reinforcing struts may change depending on the overall weight of a particular embodiment. Preferably the housing comprises at least 3-24 reinforcing struts, typically in multiples of three. A housing spine 418 completes the internal components interconnection. Finally, a housing lifting mechanism 420 is provided, enabling the device to be manipulated and moved while out of the fluid environment.

Electronics Package

The gradient sensing probes of the instant invention features an electronics package to support the operational control of the probe. The electronics package supports digital communication between a remote station and device components (e.g. the sensing segment). The electronics package also provides capabilities for data handling, processing and storage as required. In some embodiments, the electronics package also contains the power supply. In other embodiments the battery is located outside of the electronics package, while providing power to the package through an electrical interface.

Controller

An onboard controlling system provides control and data relay by direct line or wireless connection using an optical or acoustic data transmission system. The invention uses a controlling system, herein referred to as the controller, configured to give commands to various components such as the communications system, tilt orientation system, power source, sensor array, output mechanism, and the sensor converter. The controller is also operatively connected to a communications system located in the housing most often in the form of an acoustic or optical modem, or other data output mechanism, allowing for real time data and information exchange between the HFP and an external station.

The controller enables real-time operational control of the system by receiving digitized sensor data, and sending to the station via the interconnected communications system. The controller sends data from any sensors or components present in an embodiment, for example precise tilt orientation data, location, speed, external water pressure and temperature, and battery life, or a subset of that data, as selected by a user. Furthermore, the station can send commands to the device via the communications system, to change the operational parameters of components connected to the controller.

In most embodiments, the digital controller performs all common control functions, including sending and receiving electronic commands to the interconnected components, such as the wireless communications system. In some embodiments the digital controller may consist of a central processing unit (cpu), random access memory (RAM), long-term memory storage, and optional analog to digital converters. In one embodiment the controller comprises a Raspberry Pi computer coupled to an additional analog to digital converter board and long term memory. The digital controller is operatively connected to the sensors, wireless communications system, the power source and any optional integrated components. In some embodiments, the digital controller receives digitized sensor data from the sensor converter, records the data to the built-in memory storage, and sends the data to the external station (e.g. a surface vessel) via the interconnected wireless communication system. By sending this data in real-time, the present disclosure provides a means for the user adjust operation of the Gradient Sensing Device in real-time according to the data without the need to bring it to the surface in order to download and process the data.

In some preferred embodiments, the controller is operatively connected to a tilt orientation sensing mechanism such that orientation, location, speed and penetration data is timestamped and recorded to the long term memory storage or delivered to the communications system for relay to the station.

The controller in the Heat Flow Probe embodiment further analyzes incoming data from the sensor array to determine the optimal time and energy output required for the output mechanism to stimulate a sufficient thermal gradient in the penetrated medium (e.g. marine sediments). In the Magnetic Flux Probe embodiment, the digital controller further sends commands to the proton precession magnetometer (located in the gradient sensor member) to convert the hydrogen-containing liquid into dipole magnetic liquid.

In embodiments of the system with a linear sensor array, the controller analyzes data from individual sensors of the sensor array for evidence of full penetration into the medium. In HFP embodiments, the temperature data is interpretably by the controller whether or not that section of the device is in the medium (e.g. seafloor) or resting above it (e.g. ocean water). The controller will selectively disable the sensors above the medium, saving battery power, and extending device uptime.

The controller accepts commands from the station, received by the communications system to change any software-controlled operational parameters. These parameters include, but are not limited to, the time and energy outputs from the output mechanism, time interval between medium penetration and output mechanism use, sensor recording interval and interval, turning off and on of individual sensors in the sensor array.

In many embodiments, the controller consists of one or more circuit boards, which may include a microcontroller circuit board (commonly referred to as a microcontroller), one or more power management boards, and one or more distribution boards. In some embodiments, all of the circuit boards may be centralized onto one circuit board, referred to as the integrated circuit.

In many embodiments, the controller implements the user interface, the clock and timer functionality, the output mechanism control and the wireless communication control. The controller implements the user interface through the communications system while the device is underwater, and either optional air-based wireless communications system or serial port while the device is above water.

High Resolution Tilt Orientation System

Gradient data obtained by the invention are generally accompanied by a precise determination of the position of the measurement device relative to the horizontal and vertical axes (tilt orientation). The inventive system provides significant improvement over existing marine gradient sensing devices in the areas of probe orientation or tilt detection capability. The Gradient Sensing Device contains a precise orientation-sensing mechanism in four dimensions (yaw, pitch, roll and time), with 0.1, 0.075, 0.05 or more degrees of sensitivity, which is obtained by using precision accelerometers and increasing the controller's sampling rate by at least 20 Hz, 40 Hz, 60 Hz, or 120 Hz. In addition, the tilt system comprises a digital buffering capability that receives the high-speed sampling rate data, and stores it in a buffer. The buffer is overwritten if no request from the controller is made, thus enough data is stored in the controller and its associated data storage to determine the device's orientation and speed, without overloading controller's ability to store and process the data. These improvements allow for this system to be used to reliably detect small changes in a gradient, and allow for determination of the exact tilt angle (orthogonal position) of the probe when interpreting sensor data, as well as allowing for real time decision making, as to whether the HFP is correctly situated.

The tilt orientation system is located in the housing, or a housing module and connected to the controller and power source. In some embodiments, the tilt orientation system is located in and interconnected with the electronics package module. In other embodiments, it is located in the controller module. In still other embodiments, the tilt orientation system resides in its own module.

In many embodiments, the tilt orientation sensor sends three-axis positional and time information to the connected controller. Thus, the tilt orientation system allows the controller to calculate speed, orientation and injection force, and calculate penetration depth into a target medium. The tilt orientation sensor allows the controller to record highly precise information relating to the device's location in space and to annotate sensor data obtained from the gradient sensors with orientation and location data, as well as system speed in mobile embodiments. In some preferred embodiments, such as the HFP, the tilt orientation sensor allows the inventive system to compensate the thermal gradient data gathered by the probe to be properly interpreted when the system is not perfectly anti-parallel to the gradient.

In some preferred embodiments, the orientation sensor consists of a digital MEMS (micro-electronic-mechanical system) 10 degrees of freedom accelerometer, for example an Adafruit 10-DOF IMU Breakout currently available from Adfruit Industries, New York City, USA. Such a sensor allows the system to record positional information in all three dimensions, with an accelerometer, and a gyroscope, with tilt compensation with a built-in magnetometer. In other embodiments, the orientation sensor consists of a pendulous integrating gyroscopic accelerometer such as the Octans Nano from iXBlue, Natick, USA, and such systems allows the inventive system to record acceleration and location as a function of time, producing both speed and location (and therefore orientation) information. In further embodiments, the orientation sensing mechanism may consist of an inclinometer, such as the H6-FLEX currently available from Rieker Inc., or OceanTILT manufactured by OceanTools, giving the inventive system precise measurement of pitch and roll.

Communication System

The incorporation of real-time, underwater communication functionality allows for real-time data analysis and decision making. This functionality of the invention gives the user the ability to change sensing parameters or to take corrective actions before measurements, better utilizing the battery life, and further maximizing limited measurement times. In some embodiments, communication between the HFP and a surface station occurs through a hardwired tether. In other embodiments, communication is effected wirelessly through a wireless communication system. In situations where the tether breaks, or the system otherwise becomes irretrievable, the wireless communication ability prevents data loss from the irretrievable system. The underwater, communications system in some embodiments provides a real-time communications method from the device to a remote user and is operatively connected to the controller and power source. The communication system is used to send information to and from the inventive gradient-sensing probe. The data is gathered by one or more sensors, converted to digital signal by the sensor converter, processed by the controller, and delivered electronically to the communications system. For example, the controller in the Heat Flow Probe embodiment processes data gathered by the sensors and sends it to the user in a machine-readable format via the communications system, while the system is injected in the medium.

The communications system may be incorporated into any of the modules described herein. In the currently preferred embodiment, the communications system is incorporated in the electronics package In preferred embodiments of the invention, the communications system comprises a wireless, underwater Micromodem commercially available from Woods Hole Oceanographic Institution (WHOI). Embodiments with a wireless communications system are adapted to send position, tilt and sensor data (a combination or singular thereof) to the station. A user at the station may analyze the real-time data after insertion but before heating or other output to determine the quality of the probe's insertion. In some cases, the probe may be tilted significantly away from the gradient, or in other cases may have only partially penetrated the medium. In these situations, real-time communication allows the user to instruct the inventive device to abort heating, remove the device from the medium and position the device for re-insertion, saving battery life and mission time for proper insertions.

Furthermore, when the probe completes a set of readings at one site and is readied to be moved to another location, the real-time communication functionality allows the user to review the data and possibly modify parameters for the next measurement location. The communications system supports data transfer at rates from 80 to 5400 bytes per second (bps). Data rates higher than 80 bps require a communication system with a floating-point co-processor, enabling more data to be transferred. The communications system in the disclosed system provides a modifiable data transfer rate, to optimize a balance between amount of data transferred and power consumption by the communication system. The provided communication system has a range of selectable data rates, with increasing power demand as data rates increases. This ability allows a user to select a sweet spot for battery use of the system as a hole, and the amount of receivable real-time data. The communication system is further customizable for the desired distance of communication. The communication frequency may be chosen to optimize for range (e.g. 10 kHz vs. 25 kHz). Power usage may also be customized for range. Embodiments with a modular communications system can take advantage of the modifiable range by, for example, having multiple communication system modules, each with an optimal range, and as the system is deployed at different depths, the communication module may be quickly swapped out, further expanding the utility of the present disclosure.

The communication system also receives data from the user and sends it to the controller. For example, in the Heat Flow Probe embodiment, the remote user sends commands to change the amount of energy directed into the output mechanism in order to generate a measurable thermal dispersal.

In many preferred embodiments, the communications system accepts sleep or idle commands from the digital controller, allowing for the communications system to be put into idle mode while the sensors are collecting gradient measurements. This functionality further enables the Gradient Sensing Device to obtain highly precise, high-resolution gradient measurements. In further embodiments, when the inventive device is designed to remain penetrated into a medium at a location and measure gradients over a period of time, the digital controller will instruct the communications system to go into power saving mode to extend operational time. The controller will instruct the communications system to wake up at predetermined times or intervals to ping for a remote user (e.g. a surface vessel). If a ping is returned, the communications system will relay the ping to the controller, which will then send all stored data to the user via the communications system. In most embodiments, the communications system can also be put into a legacy, 'pinger mode.' The legacy pinger mode option is ideal for users who do not have access to wireless communication receiving equipment at the station, but have access to a means sufficient for intercepting and interpreting a pinger signal, e.g. a bathymetric recorder.

In some embodiments, the communication system is a wireless, acoustic modem, such as the S2CM Modems currently available from EvoLogics, Cambridge, Australia. In other embodiments the communicator system comprises of an optical modem, for example the BlueComm underwater wireless optical communication system from Sonardyne, Hampshire, UK, and as disclosed in U.S. Pat. No. 7,953,326 by Fan et al. In yet other embodiments, the communications system comprises a hydrophone transducer, such as the AquaTrans currently available from DSPComm Osborne Park, Australia.

In some embodiments, the communications system is incorporated into the tether connection. Tether cables or hoses can incorporate data transfer capabilities as disclosed in U.S. Pat. No. 9,463,849 by McCabe et al. and U.S. Patent Publication No. 2016/0369919 by Peters. The tether incorporated communications system is operatively connected to the controller.

In further embodiments, the device contains an optional, air-based wireless communications system for sending and receiving data or commands from the user while the device is out of the water. The air-based wireless communications system is operatively connected to the digital controller and power source and has the same communications capabilities as the underwater wireless communications system.

In some embodiments, the air-based wireless communications system comprise an integrated single-chip receiver/transceiver such as the Cypress Model No CYW43438, operating with 2.4 GHz IEEE 802.11 b/g/n WLAN or Bluetooth Class 1 or Bluetooth Class 2 or Frequency Modulation (FM) 65 MHz to 108 MHz FM bands, currently available from Cypress Semiconductor Corporation, San Jose, USA.

Power Source

The housing further contains a power source such as a battery, operatively connected such that it supplies power to the controller, the sensors, the orientation system, the communications system, the output mechanism and any additional optional sensors or communications systems. For connections to components in the sensing segment, all power supply connections are routed through the interconnected electrical interface.

The power source is most often one or more battery or battery packs, preferably a rechargeable battery, such as two 12-volt rechargeable lead-acid batteries connected in series manufactured by PowerSonic. The energy capacity of the power source is more than adequate for powering provided components. The power source is sized such that the system is deployed and used constantly over a period of hours up to a period of days or weeks. In some embodiments, the power source is sufficient for the system to be penetrated into a medium, left in one location to measure gradients over a period of time lasting days to more than a week.

In the preferred embodiment, the power source is suitable for continuous 24 hour use, including power demand from an output mechanism, which converts electrical power to heat, for heat flow measurements. In the currently preferred embodiment, the power source comprises a smart battery that provides a maximum of 100 mA. This maximum is sufficient to start the controller and maintain power to the controller. Any additional battery output requires an express command from the controller. In some embodiments, the power source is interconnected with an additional board, preferably a second analog to digital converter (A:D) board. This A:D board is primarily used for monitoring power source voltage, but also enables connection of any optional sensors located in or on the housing (e.g. an internal analog barometer).

Optional electronics. In some embodiments, Gradient Sensing Device further comprises an optional air-based communications system for precise, high-speed data transfer when the system is removed from the liquid environment. The air-based communications system enables the user to quickly access the entirety of the data stored in the long-term memory storage without physically accessing any of the system's internal components, or requiring an external data port.

The air-based communication system is often located in the electronics package. In some embodiments it is located in the controller module. In all embodiments the air-based communications system is operatively connected to the controller and power source, in a similar fashion as the communications system. In one preferred embodiment of the invention, the air-based communications system comprises of an integrated single-chip receiver/transceiver such as the Cypress Model No CYW43438, operating with 2.4 GHz IEEE 802.11 b/g/n WLAN or Bluetooth Class 1 or Bluetooth Class 2 or Frequency Modulation (FM) 65 MHz to 108 MHz FM bands, currently available from Cypress Semiconductor Corporation, San Jose, USA. In some embodiments, the Gradient Sensing Device contains additional sensors, including but not limited to one or more external water CTD sensors (conductivity, temperature, and pressure), cameras, and gyroscopes. These sensors can be incorporated into or onto the housing or the sensing segment and are operatively connected to the digital controller and power source when in the housing or the sensor converter when incorporated into the first supporting structure of the sensing segment. An external camera and associated lights enable the device to capture images of the surrounding penetrated medium (e.g. seafloor), for additional data capture about the penetration conditions.

Modularity

Modularity is another inventive aspect of the Gradient Sensing Device. Modularity provides the overall system superior flexibility and functionality above previous gradient-sensing systems. The modularity of the inventive system allows for a) quick replacement with interchangeable pre-calibrated sensing segments, b) quick swapping of discharged power sources with fully-charged a power source, c) increased gradient sensing capabilities with swappable controller and communication systems, and d) increased flexibility with a removable and portable controller. The modularity of the inventive device is enabled by simplified connection interfaces and release mechanisms in each modular section of the Gradient Sensing Device.

Modular Sensing Segment

In terms of in the field maintenance, the sensor array is enclosed in the gradient sensing unit and preferably, connects via a simple, detachable connection to the probe housing. The detachable functionality is enabled by simplifying the housing to sensing segment connection, which in turn is enabled by the sensor converter. Detachability allows the gradient sensing unit to be replaced if damaged. Because the system is used to penetrate a resistant medium (e.g. marine sediments), but optimal output (e.g. external heating) depends on minimal structural distance and resistance (e.g. output heat must transfer from the output mechanism, through the first support structure, and to the penetrated medium), damage to the sensing segment is common.

High performance gradient sensing devices must be calibrated before use for accurate and precise measurements. Calibration is performed with the electronic components (at least the controller and sensor array) assembled, but not encased in the support structures (see Hyndman 1979 page 196-197 and Pfender 2015 page 560). The calibration is done in the laboratory, in a controlled water bath. The bath is set to a specified temperature, the sensor readings are recorded and the bath temperature is stepped upwards, and the process is repeated. Once the calibration is complete only then can the device be fully assembled and used. Because the present disclosure comprises a digitizer (the sensor converter) located in the sensing segment, the sensing segment is calibrated independently of the housing. Thus, when damaged, a pre-calibrated replacement sensing segment can be interchanged while on the surface vehicle. Prior attempts at gradient sensing devices required disassembly, repair, and re-calibration before the device could be re-used.

Furthermore, in some instances, the inventive sensing segment may be exchanged, not for damage, but for the purpose of selecting a differently sized segment, or in some cases a segment for sensing a different type of gradient. In embodiments with the optional second support structure, it is within the scope of the invention to have embodiments where both the sensing segment and optional second support structure have detachable connections and can be removed as a unit, as well as embodiments in which the sensing segment is detached (e.g. unbolted) from the second support structure, itself being substantially fixed to the housing.

The gradient sensing segments described herein all connect with a standardized, detachable connector, such that in situations when the user requires to measure more than one type of gradient, one sensing segment is removed and replaced with a second unit containing a different type of analog sensor (see Table 1). The controller contains software programming to control and record gradients from all of the possible sensor arrays. This allows the user to employ a single probe along with multiple sensing segments, either in one location, or in as many locations as desired.

In addition, the modular design of this technology permits the user to remove and interchange components of one probe to another. This modular design extends the range of use, as the various components can be used to control different sensing segments, or can be scaled to different sized sensing segments that are best suited to one particular environment or one particular type of measurement. Furthermore, a modular design allows for simpler repair, if necessary. Spare components can be used in the event of damage, and the entire system does not need to be replaced if part of the probe is damaged beyond repair.

Modular Housing

The housing in the present disclosure forms at least one cavity 411 that is suitable for receiving a module (also referred to as a bottle). In the currently preferred embodiment, the housing comprises three cavities, also referred to herein as module receivers 411a-c, each capable of accepting identical modules. Each bottle is ideally constructed to be accepted in any of the housings receivers, and connects via a standard, commonly known electrical connection. Depending on the needs of a particular embodiment, the bottle may be pressure-resistant, or may be exposed to the ambient environment (e.g. flooded). Typically, each bottle will contain different necessary components, including but not limited to, the power source, the electronics package, a portion of the electronics package, the communications system, weights and other sensors. Each bottle contains a standard, commonly known electrical interface, a release mechanism and a sealing mechanism.

The bottle's electronical interface allows for a connection into a complementary connection constructed into the housing, thus creating a pressure-tight seal and electrical pass-through for interconnectivity of the bottle's components and the rest of the device. The bottle's release mechanism allows for a user reversibly attach and detach the bottle from the device, and allowing quick replacement or swapping with another bottle as needed.

The housing of the system contains one or more module receivers, and in some embodiments, 3, 4, 5, 6 or more module receivers. In the preferred embodiment, at least the power source is located in the power source module that further comprises a release mechanism and an electrical interface. The electrical interface comprises a standard electronics connection. When the release mechanism is activated by the user, the power source bottle is disconnected from the electrical interface and removed from the device. During use, the power source regularly becomes depleted and this modularity allows the user to remove the depleted power source (e.g. a battery pack) and insert a fully charged power source. The inventive system is then redeployed immediately, while the depleted power source is recharged separately.

In some instances, a gradient sensing system may be deployed in a remote location, such that moving a large, intact embodiment would be infeasible. In such a situation, the gradient sensing unit may remain at the remote location and the relatively small, compact probe housing modules are transported to the remote location and the system is assembled on site. This modularity gives the user additional flexibility when deploying resources to measure gradients in multiple locations, possibly worldwide, in remote locations.

In some settings, the weight needed to drive the system into the penetrable medium will change during use. For example, when used at or near the edge of the continental shelf, the topology of the sea floor can vary sustainably over the area of use. In these environments, the modularity of the buoyancy control system allows the user to add or remove weight such that the probe will continue to penetrate the medium.

The modularity features of the inventive gradient sensing probe also provide the user with additional choices for maintenance during deployment and use, or conditional-based maintenance. During use, the system may experience damage from user error or normal wear and tear, resulting in inoperable components. In the inventive system, a damaged component (such as a damaged wireless communication system) can be removed as part of the removable probe housing module and a spare probe housing module containing back up components (in this example the wireless communication system and any other components located in the probe housing) will be attached in its place. The user will then perform repairs as the system is put back into service, or the damaged component may need to be refurbished off-site. In these situations, the inventive modularity results in more system uptime than what is currently possible in the art.

Modular Electronics Package

In one preferred embodiment of the invention, the electronics package without the power source is a self-contained, removable module. In these embodiments, the module further comprises an electrical interface and a release mechanism, in the same fashion as the above described the other modules, and is most often constructed identically, with the same standard electronics connection, and release mechanism (FIGS. 4A and 4B). In other embodiments, the controller alone is reversibly detachable from the inventive system. Electronics package and controller modularity allow for easier transport of the critical components of the system, without moving the large, bulky first and or second support structures.

Additional Modules

In one embodiment, the device contains three module receivers. At least one module comprises additional weight for buoyancy control and the communications system's baffle. In this embodiment, the baffle is interconnected with the remainder of the communications system located in an electronics package module via standard connections through the two electrical interfaces and wiring internal to the housing. Further embodiments comprise 'dummy' modules that simply maintain the outer integrity and profile of the housing while having no functional components therein. In yet further embodiments, the power source is divided into two modules, typically each having an A:D board for voltage monitoring.

Buoyancy Control

In many preferred embodiments, the housing member contains a buoyancy control system that is used to drive the device into the penetrable medium which contains the gradient to be measured (and therefore is also referred to as the 'weight stand'). Most often in the preferred HFP embodiment, the preferred medium is often marine sediments found at lake or ocean bottoms, which require a substantial force to drive the Gradient Sensing Device into the medium. In some embodiments the weight will be integrated into the housing exterior. As mentioned herein, the modularity is a key aspect of the present invention as it translates into a highly adaptable and resilient system that can be used to measure multiple types of gradients without a wholly new system. The design of the buoyancy control system in some embodiments is attached to the exterior of the housing in a removable, modular manner, such that more or less weight can be added by the user as needed. In preferred embodiments, such as the Magnetic Flux Probe, the penetrated medium is the water immediately adjacent to the marine bottom, and in this embodiment little to no weight is used. Some specific embodiments of the Magnetic Flux Probe include a modular housing with modular weights where the entire housing is detachable from the magnetic gradient sensing system, such that the housing can be used on other embodiments, such as the Heat Flow Probe. In this example, the user would add additional weights to the housing once connected to the thermal gradient sensing system of the Heat Flow Probe.

In many embodiments, the buoyancy control system is comprised of a dense material such as steel, titanium-metal alloy, other rust-resistant metals, lead, concrete and any material which has a specific gravity more than that of the surrounding medium (e.g. water, seawater).

In some embodiments, the buoyancy control system is comprised of buoyant material such as foam, syntactic foam, rubber, synthetic rubber polymers, and any material with a specific gravity less than the surrounding medium. In these embodiments, the buoyancy control system acts to slow the decent to the medium at which the gradient is to be measured. For example, the Magnetic Flux Probe embodiment contains buoyant sinking weights such that the overall weight of the probe is offset and it will come to rest at the bottom of the marine environment (e.g. ocean or lake bottom) where it measures the magnetic flow of the surrounding environment. In one embodiment, the buoyant buoyancy control system is comprised of sheets of Divinycell™ HCP-70 Hydraulic Crush Point closed cell foam manufactured by DIAB. HCP-70 is a low density foam that has an operational depth rating of 450 m and a crush depth rating of 700 m, ideal for embodiments used on the continental shelf. In another embodiment the buoyant buoyancy control system comprises of SF Grade Microsphere Syntactic Foam manufactured by Engineered Syntactic Systems, which has an operational depth range of 6,000 m, ideal for deep ocean sea floor or sea mount use.

Seaworthiness

The various components of the Gradient Sensing Device, including the housing, the first support structure and the second support structure (when present) are constructed such that it is able to withstand the conditions found in the preferred penetrable mediums (e.g. fresh and salt water). The same conditions and restrains as present for the seaworthiness of the housing also apply to the gradient sensing unit.

Waterproof and Pressure Tolerant

In the majority of cases, the Gradient Sensing Device is expected to be used in bodies of fluid, where such conditions exist that are detrimental to many of the device's internal components. As such, the inventive device is constructed to withstand fluid entry into the interior (e.g. waterproofing). Fluid entry is further complicated by use in deep fluid bodies, where high levels of pressure are present (e.g. pressure tolerant). To enable pressure tolerant construction, some preferred embodiments fill the components containing internal parts (e.g. the electronics package module, battery module, controller, and the first support structure) with oil, or other suitable, non-conductive liquid as known in the art.

In other embodiments, the pressure tolerant components are enabled by the use of lining the interiors with ceramics. Other embodiments of the invention employ solid state construction, such that the component (e.g. the first support structure) is built with no internal voids. Waterproofing is achieved by constructing continuous external supports, with water resistant materials, described herein. Where components attach to one another, common waterproofing measures are utilized, including o-rings, epoxy, and potting compound. Further details for construction of a waterproof and pressure tolerant device would be known to a person skilled in the art.

Anti-Corrosive

The housing of the inventive Gradient Sensing Device is constructed such that it can withstand the normal conditions in fresh and salt water. The embodiments described herein are only a set of examples that will aid the system to withstand the conditions found in the preferred environments of use. Practitioners skilled in the art will understand that additional solutions are available to withstand the system's environment (e.g. deep salt water). To survive the environmental conditions, the probe housing has the following functionalities, including resistant to corrosion, pressure, water, and fouling. Preferred embodiments of the system are constructed of a durable metal, some embodiments will be further constructed of, or coated with a non-corrosive metal such as aluminum, or steel alloys. Untreated aluminum has very good corrosion resistance and inclusion of magnesium into the aluminum alloy of 0.5, 1, 1.5, 2, 2.5 and over 2.5% magnesium allow the system to resist corrosion and fouling.

In more durable embodiments, the system will be constructed of steel alloys. These alloys typically incorporate additional metals, including but not limited to at least chromium, nickel, and vanadium. Steel alloys allows the system to be corrosion-resistant while providing significant strength for embedding in hard-to-penetrate mediums, thus reducing the risk of damage or need of repair.

In addition, anti-corrosive coats and cathodic protection will further enable the system for use in the desired environments (e.g. salt water). Fluorokote #1® is commercially available from Metal Coatings Corp. and is a fluoropolymer coating that protects metal and fasteners from corrosion, which, in combination with corrosion-resistant metals allow the inventive system to be used in harsh environments. In some embodiments, cathodic protection provides additional corrosion control with a sacrificial anode coating over, or localized on the system, such as the PF-anode, commercially available from MATCOR. The inventive system is constructed to be water-tight, as known to practitioners skilled in the art. The above anti-corrosive systems will further enable resistance from water entering the system.

Orientation Stabilizers

While many of the preferred embodiments of the inventive Gradient Sensing Device use only gravity and the system's weight to dive the system into the desired medium, some embodiments may incorporate orientation stabilizers to maintain the proper tilt or orientation relative to the gradient, such as bladders, booms and propulsion jets.

Bladders. In order to achieve the desired orientation during use, some embodiments of the invention utilize oil-filed bladders, external to the device, and structurally connected to, most often, the housing, and less often, to the first support structure.

Booms. Other embodiments achieve orientation stabilization with fluid-displacing booms connected from at least the housing, the first support structure or the second support structure or a combination thereof.

Propulsion Jets. Further embodiments utilize propulsion jets as commonly known in the art to achieve orientation stabilization.

Optional Second Support Structure

The optional second support structure is aligned beside the sensing segment such that it allows for proper positioning of the entire probe and provides strength to the overall probe to insert into the marine subsurface, if necessary. The second support member is connected to the housing and first support structure.

Function. The optional support structure provides mechanical support to the sensing segment during system operation and penetration. In some embodiments, such as the bow string HFP, the sensing segment is constructed to maintain minimal interference between the penetrated medium and the sensor array. In order to effectively penetrate all of the preferred mediums, this embodiment requires the second support structure to physically drive the system into the penetrable medium (e.g. marine sediments). The second support structure is connected to the housing and first support structure. The connection between the two support structures comprises at least 2 support connections such that the first support structure is supported on both the distal and proximal (in relation to the housing) ends, with as many additional connections between the distal and proximal ends as needed for support. The distal most support connection, at the tip of the first and second support structures is most often constructed to form a thin, cutting blade surface, to aid in penetration of the medium.

In some (often longer) embodiments, the second support structure is further segmented. The second support structure may be constructed in several segments, each reversibly connected (e.g. bolted) to the next successive piece and terminating in a reversibly attached penetration segment for enabling efficient penetration. Illustrated in FIG. 2A, one embodiment comprises two segments 246 and 248, interconnected by a segment connector 250 and a segment connector attachment mechanism 252. Depending on the medium to be penetrated, the penetration segment may be a cutting blade, a stabbing point, or the like. A segmented second support structure enables further customization while the inventive device is on the surface vehicle. It also simplifies device transport, and enables repair, if necessary.

Sea-worthiness. The optional second support structure and associated support connections are constructed such that they withstand the normal conditions found in the preferred environments, in a similar manner as the housing and the first support structure, described herein.

Penetration Section

The ends most distant from the housing of the first and second support structures terminate in a penetration section. In the preferred embodiment, the first support structure ends in a threaded portion 207, which reversibly attaches to the first nose cone 256. The preferred embodiment further comprises a second support structure with a threaded portion 213 that accepts a second nose cone 258 with internal threading to complement thread portion 213. The currently preferred embodiment further comprises a macro tension assembly 260, standoff assembly 216 and spacers 262*a*, 262*b* that are fitted over the second support structure end before the nose cone 258 is threaded onto the threaded portion 213.

The second support structure and second nose cone further interact with a nose cone locking mechanism 258, to securely fix the penetration section in place. In the preferred embodiment; the nose cone locking mechanism comprises a commonly known steel machine key that prevents the assembled nose cone and support structure from accidental release.

Stand-Off Assemblies

The instant invention provides for mechanical connections or stand-off assemblies between the first and second support structures. The stand offs provide additional mechanical support for the thin first support structure to the second support structure, which is a heavy, strength-giving member. The stand offs may be constructed in any suitable manner, and a single embodiment may contain no stand-offs, or a range of one to ten stand-offs. The presently preferred embodiment comprises a single stand-off assembly 216, including a first collar 602 that secures the standoff to the second support structure, a second collar 606 that secures the standoff to the first support structure and a strut 604 that connects the two. Preferably, the strut is tapered on at least the edge leading towards the target, penetrable medium, as illustrated by the dotted line which would form a flat, rectangular structure if the strut was built on that dotted line. The strut may also be tapered to a smaller connection to collar 606 (FIGS. 6A and 6D).

Tether

In most preferred embodiments, the system comprises a tether connection member 110 connected to the probe housing and a vessel-based tether. The tether connection member allows for deployment and recovery of the system from an operations-based vessel. The tether connection member is constructed of a durable material such that it can withstand the tension applied between the system and the tether cable during regular use, including gravity descent, penetration, removal from the penetrated medium, and repositioning between penetration sites. In the preferred embodiment, the tether connection further comprises a mounting mechanism 234 (e.g. a 5 ton capacity swivel mount), commercially available from Miller Lifting Products, Charlton, Mass., USA, a washer mechanism 236 (e.g. a swivel tab washer), and a retaining mechanism 238 (e.g. a retaining nut). As described above, suitable hoses and other components for the tether are disclosed in U.S. Pat. No. 9,463,849 by McCabe et al. and U.S. Patent Publication No. 2016/0369919 by Peters.

Method of Use

The gradient sensing probe is an array of sensors configured in a manner to be able to measure a gradient of the modality to be measured by the sensors configured to penetrate or insert into a penetrable medium where a physical gradient exists (e.g. sediments). At a minimum, the gradient sensing unit comprises a modular sensing array, operatively connected to the probe housing and the optional support member. In some embodiments, the gradient sensing unit also comprises an output mechanism, allowing the inventive system to stimulate additional measurable gradients. The output mechanism is operatively connected to the at least the power source and in some further embodiments, to the digital controller.

The system is deployed by embedding it into the medium to be measured. In one embodiment the Gradient Sensing Device is dropped overboard at the station, and embeds in marine sediments at or beneath the ocean floor. Typical marine sediments to be measured include lake bottoms, sediments of the continental shelf, the continental slope, the abyssal plain, ocean ridges, undersea mounts, and oceanic trenches. Typical types of sediments include clay, silt, gravel or rocks. These sediments have different grain sizes and require increasing force to penetrate, or alternatively a different insertion length (and therefore, a differently sized sensing segment). In most embodiments a sufficiently weighted probe with a weighted housing disposed above it, are configured so the assembly comprising the probe may be released from a vessel on the surface, sink downward such that the force of gravity will drive the probe into the sea floor. Specific design details to assure proper embedding of the probe into the sea floor are known to the art and are described by Lister et al. 1976, and U.S. Patent Publication No. 2017/0131432 by Yang et al., for example, both incorporated herein by reference.

Different embodiments of the system are constructed to measure different gradients, such as heat flow through marine sediments, magnetic flow of marine bottoms, or sediment conductivity, to name a few. Each embodiment has different constructions, but all share the ability to measure a gradient, store the data and report it to a remote user for real-time analysis When properly deployed, the gradient sensing probe is oriented approximately perpendicular to the gradient being measured. In preferred embodiments the probe will be positioned at an angle no less than 25 degrees relative to the gradient being measured, in more preferred embodiments it will be at least 30, 35, 45, 50, 60,70,or 90 degrees. In some embodiments, the gradient sensing probe will be moved through a penetrable medium such that it moves through the gradient and changes the angle at which the system is located to the gradient as a unit of time.

Thermal. In some preferred embodiments, the sensing array comprises a high density, high precision thermal sensing array. A thermal sensing array enables the inventive system to measure heat dispersion through a medium, e.g. seafloor sediments. When an embodiment containing a thermal sensing array penetrates into the medium, the penetration generates a certain amount of thermal energy, which then dissipates with time. A thermal sensing array system measures the amount of heat in the sediment over a period of time.

A typical thermal embodiment's deployment is illustrated in FIG. 7 and is characterized maintaining the device on a station (e.g. an ocean-going vessel) 702, placing the device in the fluid body 704 while attached to the surface vehicle by a tether, allowing the device to sink downwards and penetrate into the medium from its own motive force 706, while monitoring the device's position and speed with the tilt sensor. Using the real time communications system, it can be determined if the device is inserted in an acceptable position or depth 710. If the device is properly inserted, the user has the option to change one or more operational parameter 708 on the fly. Once parameters are chosen or changed 712 (or no changes are elected), the measurement sequence commences. Next the sensor array is activated and data is recorded from each sensor. After a period of time, typically depending on sensing segment length (e.g. often 10 minutes for a 3 meter embodiment or 20 minutes for a 6 meter embodiment), the output mechanism is triggered by the controller, if the embodiment utilized comprises an optional output mechanism 716. The heat decay and dissipation is measured and recorded, for another period of time (typically the same amount of time as before the output mechanism is triggered) 718. If the device is determined not to be properly inserted, the preceding measurement steps are not performed, and the next step is performed instead. The device is removed from the penetrated medium by hauling in a length of tether 720. If additional readings are desired 722, the device is positioned above the medium by a height large enough to allow the device to regain enough falling momentum to again penetrate into the medium (e.g. 100 m above the seafloor) and the surface vehicle moves to a new location 724, towing the device along with it and the process is repeated 726. If no additional readings are required, the device is damaged or otherwise depleted (e.g. battery drain), the device is recalled to the station 728.

A typical single, continuous deployment of the inventive system from the surface vehicle comprises one penetration, reading and transporting in an hour, with about 24 repetitions thereof during a single deployment. The end of the deployment usually occurs with the device's battery drains such that there is not enough power remaining to operate the device sufficiently through a penetration and activation of its output mechanism. At this time the device is retrieved via its tether and once on deck, the surface communications system transfers all data on the device, the power source module is quickly changed with a charged power source module, and the device is immediately re-deployed if the surface vehicle is in the proper location. While re-deployed, the depleted power source is recharged for reuse. During the on-deck time, any damage to the sensing segment can be addressed by swapping the modular sensing segment with an undamaged segment.

Magnetic Sensing System. In some preferred embodiments, the sensing array comprises a highly precise magnetometer array. In these embodiments, the magnetometer array allows the system to measure magnetic gradients, or magnetic flux. Most penetrable mediums for the Magnetic Flux Probe are water (e.g. ocean water) located near a magnetic gradient (e.g. magnetic rocks in ocean sediments, or magnetic point source such as a sunken metal on the seafloor). In these embodiments, the output mechanism converts an electrical signal supplied by the power source into a low power radio frequency signal to align the protons of a free-radical containing electron-rich measurement liquid, contained in the gradient sensing unit. The radio-frequency field aligns the electron spin of the free radicals, which then couples to the measurement liquids' protons by the nuclear Overhauser effect. When the output radio-frequency is interrupted, the protons re-align to the ambient magnetic field and the realignment frequency is measured by the magnetometer array. The magnetometer is also operatively connected to the output mechanism such that it has real-time control the amount of radio-frequency signal produced. This real-time functionality further ensures that the output mechanism is stimulated properly so the magnetic field can be correctly measured.

Most preferred Magnetic Flux Probe embodiments are constructed such that the probe housing is attached in a contiguous, streamlined manner, such that the sensing array is parallel to the magnetic gradient (e.g. water adjacent to the seafloor) and so that the probe can easily penetrate through the medium.

In other embodiments, such as the Magnetic Flux Probe, the sensing array is encased in the gradient sensing unit made out of a suitable, strong container such that it resists the use environment (e.g. high pressure at the deep ocean bottom), such as aluminum, steel, steel alloy, ceramics, and plastics. The gradient sensing unit in some embodiments further is constructed such that it has improved underwater maneuverability (e.g. fins in the Magnetic Flux Probe). In this embodiment, the gradient sensing unit is operatively connected to the probe housing such that it can send and receive commands and data to the digital converted located in the probe housing.

In the Magnetic Flux Probe embodiment, the output mechanism comprises a low power radio that aligns the electron spin of the free-radicals, such that the magnetometer array measures the ambient magnetic field. In this embodiment, the output mechanism does not generate a gradient to be measured, like the Heat Flow Probe, but enforces an artificial alignment that must be interrupted in order to measure the local magnetic field gradient.

Ionic strength gradient sensing. In some embodiments, the sensing array comprises a series of highly precise electrical conductivity sensors. The ability of a penetrable medium (e.g. lake bed sediments) to conduct an electrical current demonstrates the availability in solution nutrients in a given medium. In Electrical Conductivity Gradient Probe embodiments, the sensing array comprises of a series of metal electrodes with a constant voltage supplied by the interconnected output mechanism. The applied voltage results in an electrical current through the penetrated medium, between the inner pairs of electrodes. The electrical conductivity sensor array consists of standard, digital inductive conductor sensors, such as Hach's commercially available D3725E2T Conductive Sensor.

In some embodiments, a further temperature sensing device, such as a digital thermometer, is located in the gradient sensing unit, such that the penetrated medium's ambient temperature is recorded along with the electrical conductivity by the digital controller. Electrical conductivity is highly temperature dependent and this functionality of the system further enables the user to determine the correct electrical conductivity of a medium. In further embodiments, the output mechanism enables heating of the penetrated medium immediate adjacent to the system for temperature compensation during sensor reading.

pH gradient sensing. Similarly to Electrical Conductivity Probe embodiments, some embodiments of the gradient sensing probe measure pH gradients in penetrable mediums. pH is defined as the logarithmic availability of hydrogen ions in a given solution (e.g. seawater), substrate or medium (e.g. marine sediments). The sensing array in the pH gradient probe consists of interspaced electrodes, such as the PD1P1 pH electrode, available from Hach, USA, embedded in the gradient sensing unit. For measuring pH gradients in some preferred environments, such as the seafloor, the pH gradient probe's gradient sensing unit comprises of a durable, low conductive and corrosive-resistant material, such as coated metal or ceramic, such as zirconia JK-L-Z ceramic available from Zhejiang Jinkun Zirconia Industry Co. LTD., China.

Some embodiments containing a thermal sensing array further contain an output system, also referred to herein as an output mechanism, which includes a heating element, such as commercially available Kanthal iron-chromium-aluminum resistance heating wire, connected to the digital controller and power source. After the thermal energy produced by system penetration into the medium has dissipated, the digital controller commands the power source to output a precise amount of electrical current into the output system to produce heat in the medium. Then the thermal sensing array measures the heat along the array as a unit of time.

Outputs for pH and Ionic strength. In the Electrical Conductivity and pH Probe embodiments, the output system comprises an electrical wire such that a current is supplied between pairs of electrodes. The electric potentials between the electrodes allows the system to measure ability of the penetrated medium to conduct electrical current between electrodes, allowing the system to measure either electrical conductivity or pH as depending on the sensor present.

Electromagnetic Sensing. Some embodiments of the inventive Gradient Sensing Device comprise a sensing segment comprising of electromagnetic sensors and an electromagnetic output system. Embodiments that measure the visible light portion of the electromagnetic spectrum further comprise an array of electromagnetic sensors (e.g., photosentive sensors), such as the photosynthetic photon flux density sensor LI-192 sold by Li-Core. Visible light measuring embodiments further comprise a light output system such as a string of LEDs. Light output capabilities further enables the inventive system to measure refractive objects and surfaces in the penetrable medium.

Embodiments that measure acoustic electromagnetic signals further contain sensor arrays with connected analog acoustic sensors, such as standard hydrophones. These embodiments further contain acoustic output system, such as a standard, analog, underwater speaker. Embodiments that measure portions of the electromagnetic spectrum are further constructed with clear portions of the first support structure such that the sensors and output system have a clear light path to the exterior. These embodiments are further constructed with clear materials as known in the art, such as glass, plexiglass and acrylic.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A modular submersible device for the sensing of physical gradients underwater, comprising:
    a housing;
    a sensing segment, comprising:
        a first support structure;
        a plurality of sensors, located within the first support structure;
        a first electrical interface including at least a first face and a second face, said first face attached to the first support structure and connected to the plurality of sensors and said second face attached to the housing;
        a power source; and
        an electronics package including a controller and connected to said second face;
        a sensor converter located within the first support structure and connected between the first electrical interface and the plurality of sensors, and wherein the sensor converter addresses information relating to the sensors and transmits it between itself and the controller according to a communications protocol;
    wherein the power source and electronics package are disposed within the housing and the housing is connected to the sensing segment;
    wherein said first and second faces establish fewer connections to the housing than the plurality of sensors in the sensing segment and said two faces connect together to form uninterrupted connections through the first electrical interface;
    wherein said plurality of sensors are configured to communicate via time-division multiplexing, are incorporated onto printed circuit material, and are configured to measure external gradients and to exchange data with the controller;
    wherein the power source is connected energetically to provide power to the plurality of sensors, the controller, and the electronics package, and is controlled by the controller;
    at least one module receiver and at least one module electrical interface, wherein the module receiver forms a cavity in the housing to reversibly receive a module;
    at least one module comprising a second electrical interface;
    wherein the second electrical interface forms a connection to the at least one module electrical interface;
    wherein at least one of the power source, the controller, and the electronics package is disposed within the module and connected to the second electrical interface; and
    wherein the sensing segment and the first face of the first electrical interface are reversibly attachable to the housing.

2. The device of claim 1, further comprising a tilt orientation system, connected to the controller and power source.

3. The device of claim 1, further comprising a communications system, connected to the controller and the power source, wherein the controller is capable of exchanging data with an external location through the communication system.

4. The device of claim 3, wherein said communication system is capable of sending and receiving information through water to a remote communication device.

5. The device of claim 1, wherein the electronics package is reversibly detachable from the housing and is configured to process sensor data including at least one of temperature, pH, magnetism, ion-specific data, conductivity and/or vibration.

6. The device of claim 1, wherein the sensing segment further comprises an output mechanism that is connected energetically to the power source and operatively connected to the controller.

7. The device of claim 1, further comprising at least one support connection, and a segmented second support structure comprising at least two segments and at least one segment connector, wherein the at least one support connection is connected to the first and second support structures, the at least two segments are interconnected to the segment connector, and the second support structure is connected to the housing.

8. The device of claim 7, further comprising at least one penetration section, wherein the second support structure comprises an end distal to the housing, and the at least one penetration section reversibly attached to the second support structure distal end.

9. A method of measuring a gradient in a target medium underwater, comprising:
   (a) selecting a gradient sensing device including a housing, a power source, an electronics package including a controller, and a sensing segment, comprising:
   a first support structure;
   a plurality of sensors, located within the first support structure; and
   a first electrical interface including at least a first face and a second face, said first face attached to the first support structure and said second face attached to the housing and connected to the plurality of sensors;
   a communications system, connected to the controller and the power source, wherein the controller is capable of exchanging data with an external location through the communication system;
   at least one module receiver and at least one module electrical interface, wherein the module receiver forms a cavity in the housing to reversibly receive a module;
   at least one module comprising a second electrical interface;
   a sensor converter located within the first support structure and connected between the first electrical interface and the plurality of sensors, wherein the sensor converter addresses information relating to the sensors and transmits it between itself and the controller according to a communications protocol;
   wherein the second electrical interface forms a connection to the at least one module electrical interface;
   wherein said plurality of sensors are configured to communicate via time-division multiplexing, are incorporated onto printed circuit material, and are configured to measure external gradients and to exchange data with the controller;
   wherein at least one of the power source, the controller, and the electronics package is disposed within the module and connected to the second electrical interface;
   wherein the sensing segment and the first face of the first electrical interface are reversibly attachable to the housing; and
   wherein the power source is connected energetically to provide power to the plurality of sensors, the controller, and the electronics package, and is controlled by the controller;
   (b) deploying the gradient sensing device into a body of water and placing the gradient sensing device in proximal to the target medium underwater; and
   (c) operating the sensing segment to measure the gradient in said target medium.

10. The method of claim 9, further comprising a step after step (b) of penetrating the target medium.

11. The method of claim 9, wherein said communication system is capable of sending and receiving information through water to a remote communication device, and operating the sensing segment includes sending and receiving information through water to the remote communication device.

12. The method of claim 9, wherein operating includes remotely changing at least one operational parameter of the gradient sensing device, including at least one of activating individual sensors, deactivating individual sensors, or altering measurement time.

13. The method of claim 12, wherein the sensing segment further includes an output mechanism and is operated to stimulate a gradient in the target medium.

14. The method of claim 13, wherein the gradient sensing device changes at least one operational parameter, including at least one of externally transmitted heat pulse duration, pulse delay or pulse intensity.

15. The method of claim 9 wherein the gradient sensing device is selected having at least two modules, wherein the power source is disposed within one module and the electronics package is disposed within another of the at least two modules, and further including removing the power source when it is depleted and inserting another power source to replace the depleted power source.

16. The method of claim 9, wherein the electronics package is reversibly detachable from the housing and is configured to process sensor data including one of temperature, pH, magnetism, ion-specific data, conductivity and/or vibration, and further including removing that electronics package and replacing it with another electronics package that is configured to process sensor data that is a different one of temperature, pH, magnetism, ion-specific data, conductivity and/or vibration.

17. A modular submersible device for the sensing of physical gradients underwater, comprising:
   a sensing segment, comprising:
      a first support structure;
      a plurality of sensors, located within the first support structure;
      a first electrical interface, attached to the first support structure;
      a sensor converter located within the first support structure and connected to the first electrical interface and the plurality of sensors; and
   a housing, comprising:
      a power source;
      an electronics package including a controller, and a tilt orientation system;
      wherein the tilt orientation system is configured to measure device orientation with resolution of less than 0.5 degrees sensitivity in three dimensions;
      wherein the power source, and electronics package are disposed within the housing and the housing is connected to the sensing segment and the first electrical interface;
   wherein said plurality of sensors are configured to communicate via time-division multiplexing, are incorporated onto printed circuit material, and are configured to measure external gradients and to exchange data with the sensor converter and the sensor converter is configured to exchange data with the controller; and
   wherein the power source is connected energetically to provide power to the plurality of sensors, the sensor converter, the controller, and the electronics package, and is controlled by the controller;
   at least one module receiver and at least one module electrical interface, wherein the module receiver forms a cavity in the housing to reversibly receive a module;
   at least one module comprising a second electrical interface;
   wherein the second electrical interface forms a connection to the at least one module electrical interface;
   wherein at least one of the power source, the controller, and the electronics package is disposed within the module and connected to the second electrical interface; and
   wherein the sensing segment and the first face of the first electrical interface are reversibly attachable to the housing.

18. The device of claim 17, further comprising a communications system, connected to the controller and the power source, wherein the controller is capable of exchanging data with an external location through the communication system.

19. The device of claim 17, further comprising at least one support connection, a segmented second support structure comprising at least two segments and at least one segment connector, wherein the at least one support connection is connected to the first and second support structures, the at least two segments are interconnected to the segment connector, and the second support structure is connected to the housing.

20. The device of claim 19, further comprising at least one penetration sections, wherein the second support structure comprises an end distal to the housing, and the at least one penetration section reversibly attached to the second support structure distal end.

\* \* \* \* \*